US011315441B2

(12) United States Patent
Okano et al.

(10) Patent No.: US 11,315,441 B2
(45) Date of Patent: Apr. 26, 2022

(54) ORGAN MODEL

(75) Inventors: Yoshio Okano, Ootsu (JP); Hiroshige Sasaki, Uju (JP)

(73) Assignee: YUUGENGAISHA SEIWADENTAL, Ootsu (JP)

( * ) Notice: Subject to any disclaimer, the term of this patent is extended or adjusted under 35 U.S.C. 154(b) by 1476 days.

(21) Appl. No.: 13/266,622

(22) PCT Filed: Apr. 27, 2010

(86) PCT No.: PCT/JP2010/057411
§ 371 (c)(1),
(2), (4) Date: Oct. 27, 2011

(87) PCT Pub. No.: WO2010/126018
PCT Pub. Date: Nov. 4, 2010

(65) Prior Publication Data
US 2012/0045743 A1 Feb. 23, 2012

(30) Foreign Application Priority Data

Apr. 28, 2009 (JP) .............................. JP2009-108642
May 31, 2009 (JP) .............................. JP2009-131660
Oct. 2, 2009 (JP) .............................. JP2009-230320

(51) Int. Cl.
*G09B 23/30* (2006.01)
*C08K 3/36* (2006.01)
*C08L 29/04* (2006.01)

(52) U.S. Cl.
CPC ............... *G09B 23/30* (2013.01); *C08K 3/36* (2013.01); *C08L 29/04* (2013.01); *Y10T 428/31667* (2015.04); *Y10T 428/31909* (2015.04)

(58) Field of Classification Search
CPC .................................................. G09B 23/30
(Continued)

(56) References Cited

U.S. PATENT DOCUMENTS 3,592,936 A * 7/1971 Marcus et al. ................ 514/708
3,738,957 A * 6/1973 Iler .............................. 524/557
(Continued)

FOREIGN PATENT DOCUMENTS

EP 0135628 A2 * 3/1985
EP 1251013 A2 10/2002
(Continued)

OTHER PUBLICATIONS

"Thermodynamic properties of small amorphous and crystalline Silica particles at low temperatures" by A. Nittke; P. Esquinazi; H.-C. Semmelhack, A.L. Burin, and A.Z. Patashinskii, Department of Chemistry and Material Science, Northwestern University, Evanston IL 60208, USA.*
(Continued)

*Primary Examiner* — Bruk A Gebremichael
(74) *Attorney, Agent, or Firm* — Westerman, Hattori, Daniels & Adrian, LLP

(57) ABSTRACT

A material for forming an organ model containing an aqueous gel, which comprises polyvinyl alcohol having an average degree of polymerization of 300 to 3500 and a degree of saponification of not less than 90% by mole, and silica particles; a method for producing a material for forming an organ model, comprising cooling an aqueous polyvinyl alcohol solution which contains polyvinyl alcohol having an average degree of polymerization of 300 to 3500 and a degree of saponification of not less than 90% by mole and silica particles, to a temperature of −10° C. or lower, and thawing the resulting formed aqueous gel; and an organ model at least provided with a surface layer comprising the material for forming an organ model. Thus, it is possible to provide: an organ model which has a hydrophilic property similar to an organ of a human body, gives such an incision feel that an incised portion spreads just similar to a living
(Continued)

human organ and, therefore can be appropriately used in, for example, exercising surgical procedures; a material for forming an organ model appropriately usable for the organ model; and a method for producing the same.

15 Claims, 2 Drawing Sheets

(58) Field of Classification Search
USPC ....... 434/267; 424/484; 162/164.7; 503/226; 507/241; 514/708, 54; 524/557
See application file for complete search history.

(56) References Cited

U.S. PATENT DOCUMENTS

| | | | | |
|---|---|---|---|---|
| 3,767,437 | A * | 10/1973 | Cruz, Jr. | C08L 89/06 106/151.1 |
| 4,134,218 | A * | 1/1979 | Adams | G09B 23/30 434/267 |
| 4,279,752 | A * | 7/1981 | Sueoka | B01D 67/003 210/500.22 |
| 4,481,001 | A * | 11/1984 | Graham | G09B 23/285 434/267 |
| 4,734,097 | A * | 3/1988 | Tanabe | A61L 27/16 264/28 |
| 5,061,187 | A * | 10/1991 | Jerath | G09B 23/286 434/262 |
| 5,266,224 | A * | 11/1993 | Sharif | 507/241 |
| 5,349,008 | A * | 9/1994 | Takada et al. | 524/557 |
| 5,977,021 | A * | 11/1999 | Aoyama et al. | 503/226 |
| 7,521,434 | B2 * | 4/2009 | Leshchiner et al. | 514/54 |
| 7,993,140 | B2 * | 8/2011 | Sakezles | 434/267 |
| 2004/0126746 | A1 | 7/2004 | Toly | G09B 23/28 434/262 |
| 2005/0186361 | A1* | 8/2005 | Fukuda | G09B 23/30 428/15 |
| 2005/0202229 | A1* | 9/2005 | Ozasa | B29C 43/003 428/304.4 |
| 2006/0184005 | A1* | 8/2006 | Sakezles | G09B 23/28 600/416 |
| 2007/0036844 | A1* | 2/2007 | Ma | B29C 67/20 424/443 |
| 2008/0073022 | A1* | 3/2008 | Hyde | C09J 129/04 156/158 |
| 2008/0243127 | A1* | 10/2008 | Lang | A61B 17/1739 606/87 |
| 2008/0260831 | A1* | 10/2008 | Badylak et al. | 424/484 |
| 2009/0068627 | A1* | 3/2009 | Toly | 434/267 |
| 2009/0298033 | A1* | 12/2009 | Suzuki | G09B 23/30 434/263 |
| 2010/0175845 | A1* | 7/2010 | Gauto et al. | 162/164.7 |

FOREIGN PATENT DOCUMENTS

| | | | | |
|---|---|---|---|---|
| JP | 02-026567 | * | 1/1990 | A61N 5/02 |
| JP | 2-026567 A | | 1/1990 | |
| JP | 04-062010 | * | 2/1992 | B29C 33/50 |
| JP | 4-062010 A | | 2/1992 | |
| JP | 05-027776 U | | 4/1993 | |
| JP | 06-004768 U | | 1/1994 | |
| JP | 06-226748 | * | 8/1994 | B29C 33/38 |
| JP | 6-226748 A | | 8/1994 | |
| JP | 11-167342 A | | 6/1999 | |
| JP | 2000-080126 | * | 3/2000 | C08F 116/06 |
| JP | 2000-080126 A | | 3/2000 | |
| JP | 2005-195696 A | | 7/2005 | |
| JP | 2006-126686 A | | 5/2006 | |
| JP | 2007-316343 A | | 12/2007 | |
| JP | 2007-316434 | * | 12/2007 | G09B 23/28 |
| JP | 2007-316434 A | | 12/2007 | |
| JP | 2008-241988 | * | 9/2008 | G09B 23/28 |
| JP | 2008-241988 A | | 10/2008 | |
| JP | 2008-261990 A | | 10/2008 | |
| JP | 2010-156894 A | | 7/2010 | |
| JP | 2010-277003 A | | 12/2010 | |
| JP | 2011-076035 A | | 4/2011 | |

OTHER PUBLICATIONS

Mechanistic analysis of protein delivery from porous poly(vinyl alcohol) systems by N.A. Peppas, and R.E.P. Simmons; Departments of Chemical Engineering and Biomedical Engineering, and Division of Pharmaceutics, The University of Texas at Austin, 1 University Station, C0400, Austin, TX 78712-0231, United States: Present address: School of Medicine.*
An In situ Injectable Physically and Chemically Gelling NIPAAm-based Copolymer System for Embolization by Bae Hoon Lee, Bianca West, Ryan McLemore, Christine Pauken, and Brent L Vernon; dated Jun. 2006.*
Mechanistic analysis of protein delivery from porous poly(vinyl alcohol) systems by N.A. Peppas, and R.E.P. Simmons; Departments of Chemical Engineering and Biomedical Engineering, and Division of Pharmaceutics, The University of Texas at Austin, 1 University Station, C0400, Austin, TX 78712-0231, Currently at John Hopkins Univ, School of Medicine.*
International Search Report of PCT/JP2010/057411, dated Jul. 13, 2010.
Grodzinski, Joseph Jagur, "Polymeric gels and hydrogels for biomedical and pharmaceutical applications." Polymers for Advanced Technologies, Jan. 1, 2009, pp. XP055164407, 1042-7147. cited in Extended European Search Report dated Feb. 11, 2015.
Extended European Search Report dated Feb. 11, 2015, issued in corresponding European Application No. 10769716.1 (7 pages).
U.S. Notice of Allowance dated Feb. 11, 2014 issued in related U.S. Appl. No. 13/392,177.
International Search Report of PCT/JP2010/065473, dated Oct. 5, 2010.
European Search Report Application No. 10820320.9, dated Apr. 3, 2013 (4 pp).
U.S. Office Action dated Oct. 10, 2013, issued in related U.S. Appl. No. 13/392,177 (17 pp).

* cited by examiner

[Figure 1]

[Figure 2]
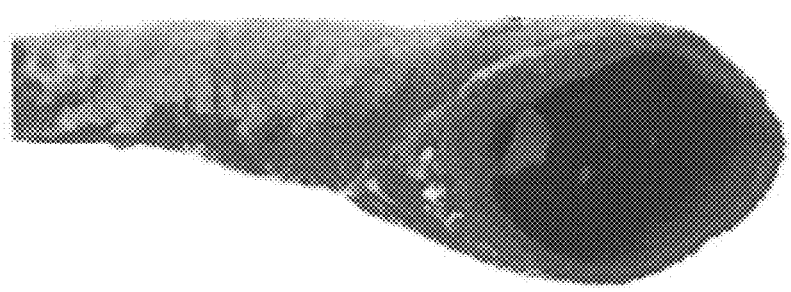
1cm

ORGAN MODEL

TECHNICAL FIELD

The present invention relates to an organ model. More particularly, the present invention relates to an organ model which can be suitably used for exercising an operation such as incision, cutting or suture of a human body and the like, and exercising an operation with an endoscope, and the like, and a material for molding an organ model, which can be suitably used for the above organ model and a process for producing the same. The organ model of the present invention can also be suitably used for checking the sharpness of an excision implement for operation, such as a scalpel for operation, a knife for operation or a laser scalpel.

BACKGROUND ART

Among operations performed by a surgeon, a surgical operation of an organ such as a heart by using a scalpel for operation or the like is an operation requiring a prudent and skillful technique which directly relates to a matter of life and death, because when the incised portion formed by a surgical operation is too deep, the incised portion might become a fatal wound. Therefore, since a highly skilled operation technique is required for a surgeon, the surgeon has conventionally exercised a surgical operation by using an internal organ of an animal such as a swine.

However, when the exercise of a surgical operation is performed by using an internal organ of an animal, freshness is required for the internal organ. When an operator is injured during the exercise of a surgical operation by falling in the operative procedure, there is a possibility that the operator is infected by a germ and the like which are contained in the internal organ of an animal from the wound. Moreover, a great cost is required for sanitary management of instruments which are used when the exercise of a surgical operation is performed, and disposal of the used internal organ. Furthermore, the internal organ of an animal for the exercise of a surgical operation has not yet been widely spread to a medical student, a medical intern, a practitioner, and the like.

As the internal organ of an animal which is used by a surgeon and the like for exercising a surgical operation, an internal organ of an animal such as a swine has been used. However, in recent years, it has been earnestly desired to develop an artificial organ model having properties similar to the organ of such an animal and being able to be used in place of the organ of the animal from the viewpoint of animal welfare, sanitation and the like.

When a surgeon and the like exercise an operation in order to improve their technique, as an artificial organ model similar to the organ of a living body, for example, a model made of silicone, a urethane elastomer, a styrene elastomer or the like has been proposed (for example, refer to patent document 1).

However, the organ model made of such a material does not have hydrophilic property like a living body since the material of the organ model has water repellency. Moreover, when a surgical operation is performed, its incised portion closes and does not open. In addition, the organ model is quite different from a human body in feeling of cutting and tactile property. Therefore, it cannot be said that the organ model is suitable for the surgeon and the like to exercise a surgical operation.

As a model of a biological soft tissue, there is proposed a model obtained by pouring a solution in which two kinds of a polyvinyl alcohol are dissolved into a mold for producing a model of a biological soft tissue, cooling the solution to be gelled, taking out the obtained aqueous gel composition from the mold (for example, refer to patent document 2).

However, there are some defects in this model of a biological soft tissue, such that the procedure for preparing the composition is complicated because two kinds of a polyvinyl alcohol are required as a raw material in its production steps, and that the model has an incision feel which is considerably different from an organ of a living body because the model is sticky on its surface and brittle, and has a low tensile strength.

Therefore, in recent years it has been desired by a practitioner, a medical university, a surgical hospital and the like to develop an organ model which has a suitable hydrophilic property, an incision feel that an incised portion opens like an organ of a living body when an incision is performed and no stickiness, and which can be suitably used for exercising an operation.

PRIOR ART DOCUMENTS

Patent Documents

Patent Document 1: Japanese Unexamined Patent Publication 2008-241988

Patent Document 2: Japanese Unexamined Patent Publication 2007-316434

SUMMARY OF THE INVENTION

Problems to be Solved by the Invention

The present invention has been accomplished in view of the above-mentioned prior arts. An object of the present invention is to provide an organ model which has a suitable hydrophilic property similar to an organ of a living human body, an incision feel that an incised portion opens like an organ of a human living body when an incision is performed, and which can be suitably used for a surgeon and the like to exercise an operation, and a material for molding an organ model which can be suitably used for the above organ model and a process for producing the same.

Means for Solving the Problems

The present invention relates to
(1) a material for molding an organ model, comprising an aqueous gel which comprises a polyvinyl alcohol having an average degree of polymerization of 300 to 3500 and a degree of saponification of not less than 90% by mole, and silica particles,
(2) a process for producing a material for molding an organ model, comprising cooling an aqueous polyvinyl alcohol solution comprising a polyvinyl alcohol having an average degree of polymerization of 300 to 3500 and a degree of saponification of not less than 90% by mole and silica particles to a temperature of −10° C. or lower, and thawing the resulting formed aqueous gel, and
(3) an organ model having at least a surface layer comprising the material for molding an organ model as described in the above item (1).

Effects of the Invention

Since the material for molding an organ model of the present invention has a hydrophilic property similar to an organ of a human body, an incision feel that an incised portion opens like an organ of a living human body when an incision is performed, the material for molding an organ model can be suitably used for a surgeon and the like to exercise an operation.

According to the process for producing a material for molding an organ model, there can be produced a material for molding an organ model having a hydrophilic property similar to a human body, an incision feel that an incised portion opens like an organ of a living body when an incision is performed.

Since the organ model of the present invention has a hydrophilic property similar to a human body, an incision feel that an incised portion opens like an organ of a living body when an incision is performed, the organ model can be suitably used as an organ model which is used when, for example, an exercise of operation is performed.

BRIEF EXPLANATION OF THE DRAWINGS

FIG. 1 A photograph substituted for a drawing, showing an organ model having a shape similar to the shape of a liver of a human body, obtained in example 26 of [example I] according to the present invention.

FIG. 2 A photograph substituted for a drawing, showing an organ model having a shape similar to the shape of a small intestine of a human body, obtained in example 27 of [example I] according to the present invention.

MODES FOR CARRYING OUT THE INVENTION

In the present invention, in view of the above-mentioned prior arts of conventional organ models, studies have been earnestly carried out. As a result, it has been eventually found out that an organ model having a surface layer comprising a material containing a polyvinyl alcohol having an average degree of polymerization of 300 to 3500 and a degree of saponification of not less than 90% by mole, and silica particles as a material for constituting the organ model has a hydrophilic property similar to a human body, the incised portion of which opens like an organ of a living body when an incision is performed, and which can be suitably used for a surgeon and the like to exercise an operation. The present invention has been accomplished based on the above knowledge.

The material for molding an organ model of the present invention is expected to be used in place of an organ of an animal such as a swine, which has been conventionally used, from the viewpoint of animal welfare, hygienic aspect and the like.

The surface layer of an organ model may be formed with the material for molding an organ model of the present invention, and an organ model itself may be composed of the material. When the surface layer of an organ model is formed from the material for molding an organ model of the present invention, the material is used as a surface material for an organ model.

The material for molding an organ model of the present invention contains an aqueous gel which comprises a polyvinyl alcohol having an average degree of polymerization of 300 to 3500 and a degree of saponification of not less than 90% by mole, and silica particles.

The material for molding an organ model of the present invention can be easily produced by, for example, cooling an aqueous polyvinyl alcohol solution containing a polyvinyl alcohol having an average degree of polymerization of 300 to 3500 and a degree of saponification of not less than 90% by mole, and silica particles to a temperature of −10° C. or lower, and thawing the resulting formed aqueous gel.

The average degree of polymerization of the polyvinyl alcohol as determined by viscometry is preferably not less than 300, more preferably not less than 500 and still more preferably not less than 1000 from the viewpoint of increase in mechanical strength of the material for molding an organ model of the present invention, and preferable not more than 3500, more preferably not more than 3000 and still more preferably not more than 2500 from the viewpoint of imparting of a desired elasticity similar to an organ of a human body.

The degree of saponification of the polyvinyl alcohol is preferably not less than 90% by mole, more preferably not less than 95% by mole, still more preferably not less than 98% by mole from the viewpoint of increase in mechanical strength and elastic modulus of the material for molding an organ model of the present invention. The upper limit of the degree of saponification of the polyvinyl alcohol is not limited, and it is preferable that the higher the degree of saponification of the polyvinyl alcohol is. It is more preferable that the polyvinyl alcohol is a completely saponified polyvinyl alcohol.

The polyvinyl alcohol can be usually used as an aqueous solution. When the polyvinyl alcohol is dissolved in water, it is preferable that the polyvinyl alcohol or water is previously heated from the viewpoint of the increase in solubility of the polyvinyl alcohol. The heating temperature is not particularly limited and can be usually 60 to 95° C. or so.

The concentration of the polyvinyl alcohol in the aqueous polyvinyl alcohol solution is preferably not less than 1% by weight, more preferably not less than 3% by weight and still more preferably not less than 5% by weight from the viewpoint of increase in mechanical strength of the material for molding an organ model of the present invention, and preferably not more than 40% by weight, more preferably not more than 30% by weight and still more preferably not more than 20% by weight from the viewpoint of sufficient dissolution of the polyvinyl alcohol in water, prevention of stickiness and increase in moldability.

The material for molding an organ model of the present invention contains silica particles. Since the material for molding an organ model of the present invention contains silica particles as mentioned above, even though repetition of the freezing and thawing of the aqueous polyvinyl alcohol solution, which has conventionally been employed, is not carried out, the material for molding an organ model has a suitable hydrophilic property and does not have a sticky surface. Moreover, when an incision is performed by using the material, an incised portion opens like an organ of a living body, and the material shows an incision feel or a tactile property similar to an organ of a living body, and is excellent in mechanical strength.

It is preferable that the particle diameter of the silica particles is 3 to 100 nm or so from the viewpoint of improvement in dispersion stability in the polyvinyl alcohol and smoothness of the material for molding an organ model of the present invention.

It is preferable that the silica particles are used, for example, in the form of colloidal silica. It is preferable that the content of the silica particles in the colloidal silica is 3 to 40% by weight or so from the viewpoint of improvement in dispersion stability in the polyvinyl alcohol and increase in mechanical strength of the material for molding an organ model of the present invention. The colloidal silica can be commercially available, for example, from Nissan Chemical Industries Ltd. under the trade name of SNOWTEX (registered trademark), and the like.

The amount of the silica particles based on 100 parts by weight of the polyvinyl alcohol is preferably not less than 0.01 parts by weight, more preferably not less than 0.05 parts by weight and still more preferably not less than 0.1 parts by weight from the viewpoint of increase in mechanical strength and elasticity, prevention of stickiness of the material for molding an organ model of the present invention and imparting of hydrophilic property and water wettability to the material, and preferably not more than 50 parts by weight, more preferably not more than 30 parts by weight and still more preferably not more than 20 parts by weight from the viewpoint of the prevention of hardening of the material for molding an organ model of the present invention. Incidentally, the above-mentioned amount of water contains the water which is included in the colloidal silica when the colloidal silica is used as the silica particles. The silica particles can be usually mixed with the polyvinyl alcohol or its aqueous solution.

In the material for molding an organ model of the present invention, it is preferable that the aqueous gel is a crosslinked gel being crosslinked with dimethyl sulfoxide, since the crosslinked gel has a suitable hydrophilic property, an incision feel that an incised portion opens like an organ of a living body when an incision is performed, suitable tensile strength and no stickiness, and therefore, can be suitably used for an organ model being used in the exercise of an operation, and the like. When the aqueous gel is a crosslinked gel, the material for molding an organ model of the present invention contains a crosslinked gel comprising a polyvinyl alcohol having an average degree of polymerization of 300 to 3500 and a degree of saponification of not less than 90% by mole, and silica particles.

According to the present invention, as a material for constituting an organ model, it has been found out that an organ model having a surface layer comprising a material containing a crosslinked gel made of a polyvinyl alcohol having an average degree of polymerization of 300 to 3500 and a degree of saponification of not less than 90% by mole, and silica particles has a suitable hydrophilic property, an incision feel that an incised portion opens like an organ of a living body when an incision is performed, suitable tensile strength and no stickiness, and therefore, can be suitably used as an organ model being used in the exercise of an operation by a practitioner and the like.

When the material for molding an organ model of the present invention is a crosslinked gel being crosslinked with dimethyl sulfoxide, the material for molding an organ model can be easily produced, for example, by cooling a polyvinyl alcohol-mixed solution comprising a polyvinyl alcohol having an average degree of polymerization of 300 to 3500 and a degree of saponification of not less than 90% by mole, silica particles, dimethyl sulfoxide and water to a temperature of −10° C. or lower, and thereafter thawing the resulting formed aqueous gel.

In this case, the polyvinyl alcohol can be usually added to a mixed solvent of dimethyl sulfoxide and water, water which is used in the mixed solvent, or a mixture prepared by adding the silica particles to the mixed solvent.

The ratio of dimethyl sulfoxide to water (dimethyl sulfoxide/water: volume ratio) is preferably not less than 50/50, more preferably not less than 60/40 and still more preferably not less than 70/30 from the viewpoint of increase in tensile strength of the material for molding an organ model of the present invention, and preferably not more than 95/5, more preferably not more than 90/10 and still more preferably not more than 85/15 from the viewpoint of suppression of stickiness of the surface of the material for molding an organ model of the present invention.

In the material for molding an organ model of the present invention, it is preferable that the aqueous gel is composed of a crosslinked gel prepared by crosslinking a polyvinyl alcohol with a boric acid compound from the viewpoint of suppression of stickiness on its surface, lowering of water content and suppression of excess swelling when a gel being dried is supplied with water, as well as elasticity similar to an organ of a living body, expanding of an incised portion similar to an organ of a living body when an incision is performed, approximation of water wettability and an incision feel to an organ of a living body.

According to the present invention, when a crosslinked gel prepared by crosslinking a polyvinyl alcohol with a boric acid compound is used as a material for molding an organ model, it has been marvelously found out that an organ model has excellent properties such as no stickiness on its surface, low water content and suppression of excess swelling when a gel being dried is supplied with water, as well as expanding of an incised portion similar to an organ of a living body when an incision is performed, water wettability and an incision feel similar to an organ of a living body, and can be suitably used for a practitioner and the like to exercise an operation.

The material for molding an organ model of the present invention, which is crosslinked with a boric acid compound can be suitably used in an organ model in which at least a surface layer comprises the crosslinked gel being crosslinked with the boric acid compound. Incidentally, the above-mentioned surface layer means the outer surface of an organ model.

The boric acid compound can be one which generates boric acid ion. The boric acid compound includes, for example, boric acid, a salt of boric acid, an ester of boric acid and the like, and these can be used alone or in combination of at least two kinds. Among the boric acid compounds, from the viewpoint of compatibility with an aqueous polyvinyl alcohol solution, boric acid and a salt of boric acid are preferable, and boric acid and an inorganic salt of boric acid are more preferable, and from the viewpoint of crosslinking property, boric acid is still more preferable. The salts of boric acid includes, for example, metal salts of boric acids such as metaboric acid and tetraboric acid, ammonium borate, and the like. Among them, an alkali metal salt of metaboric acid is preferable since the alkali metal salt of metaboric acid is excellent in water solubility. Among the alkali metals, sodium and potassium are preferable.

The boric acid compound can be mixed with the aqueous polyvinyl alcohol solution as it is in the form of, for example, powder. It is preferable that the boric acid compound is used in the form of aqueous solution of the boric acid compound, which is previously prepared by dissolving the boric acid compound in water from the viewpoint of homogeneous mixing of the boric acid compound with the aqueous polyvinyl alcohol solution.

The concentration of the boric acid compound in the aqueous solution of the boric acid compound is preferably not less than 1 g/L (liter), more preferably not less than 5 g/L and still more preferably not less than 10 g/L from the viewpoint of increase in crosslinking efficiency. The upper limit of the concentration of the boric acid compound in the aqueous solution of the boric acid compound differs depending on the liquid temperature of the aqueous solution of the boric acid compound, and is a saturated concentration of the boric acid compound in the aqueous solution of the boric acid compound. In the present invention, it is preferable that the aqueous solution of the boric acid compound is a saturated aqueous solution of the boric acid compound. The saturated aqueous solution of the boric acid compound can be easily prepared by, for example, sufficiently dissolving the boric acid compound in warm water which is heated in order to increase the solubility of the boric acid compound, and thereafter, cooling the resulting aqueous solution of the boric acid compound until crystals of the boric acid compound are precipitated. The liquid temperature of the aqueous solution of the boric acid compound is not particularly limited, and is usually preferably from room temperature to 40° C. or so.

The amount of the boric acid compound based on 100 parts by weight of the polyvinyl alcohol differs depending on the average degree of polymerization of the polyvinyl alcohol, and is preferably not less than 1 part by weight, more preferably not less than 3 parts by weight and still mote preferably not less than 5 parts by weight from the viewpoint of sufficient crosslinking of the polyvinyl alcohol, and preferably not more than 60 parts by weight, more preferably not more than 55 parts by weight and still more preferably not more than 50 parts by weight from the viewpoint of reduction of the amount of remaining unreacted boric acid compound.

The polyvinyl alcohol is gelled when the polyvinyl alcohol is contacted with the boric acid compound since the polyvinyl alcohol is crosslinked. When the polyvinyl alcohol is contacted with the boric acid compound, it is preferable that the polyvinyl alcohol and the boric acid compound are used as an aqueous solution, respectively, as mentioned above. The temperature when the polyvinyl alcohol is contacted with the boric acid compound is not particularly limited, and is usually preferably from room temperature to 40° C. or so from the viewpoint of acceleration of crosslinking of the polyvinyl alcohol to increase production efficiency.

As a method for crosslinking the polyvinyl alcohol with the boric acid compound, there can be cited, for example, a method comprising adding the aqueous solution of the boric acid compound to the aqueous polyvinyl alcohol solution, a method comprising adding the aqueous polyvinyl alcohol solution to the aqueous solution of the boric acid compound, and the like. When the aqueous solution of the boric acid compound is added to the aqueous polyvinyl alcohol solution, since a crosslinked gel is generated by crosslinking the polyvinyl alcohol, and exists nearby the surface of water, this crosslinked gel can be collected.

Since the polyvinyl alcohol has been crosslinked by the boric acid compound, the collected crosslinked gel has some advantages such as being excellent in elasticity, low water content, low stickiness, and little swelling when the crosslinked gel being dried is supplied with water, in comparison with a crosslinked polyvinyl alcohol gel prepared by freezing and thawing an aqueous polyvinyl alcohol solution to crosslink the polyvinyl alcohol.

This crosslinked gel is useful for forming at least a surface layer of the organ model of the present invention. The thickness of the surface layer cannot be absolutely determined since the thickness differs depending on the kind of an organ of a living body. Therefore, it is preferable that the thickness is properly determined in accordance with the kind of the organ of a living body. The thickness of the surface layer is usually 0.1 to 20 mm or so from the viewpoint of the production of an organ model similar to an organ of a living body.

It is preferable that the aqueous polyvinyl alcohol solution contains a polysaccharide from the viewpoint of prevention of the surface layer from drying.

The polysaccharide includes for example, chitin, deacetylated chitin, chitosan, chitosan acetate, chitosan maleate, chitosan glycolate, chitosan solvate, chitosan formate, chitosan salicylate, chitosan propionate, chitosan lactate, chitosan itaconate, chitosan naiacinate, chitosan gallate, chitosan glutamate, carboxymethyl chitosan, alkyl cellulose, nitro cellulose, hydroxypropyl cellulose, starch, collagen, alginate, hyaluronic acid, heparin, and the like, and the present invention is not limited only to those exemplified ones. Among them, chitosan and its derivatives are preferable, and chitosan is more preferable from the viewpoint of the prevention of the material for molding an organ model of the present invention from drying.

The chitosan includes, for example, those prepared by deacetylation of chitins derived from crustaceans such as shrimps, crabs and cuttlefishes, and the like. The chitosan is commercially easily available. Usually, the chitosan can be used in the form of powder. The molecular weight of the chitosan is not particularly limited, and is usually preferably 10000 to 200000, and more preferably 10000 to 40000.

The amount of the polysaccharide cannot be absolutely determined because the amount depends on its kind and the like, and is usually preferably not less than 0.3 parts by weight, more preferably not less than 0.5 parts by weight and still more preferably not less than 1 part by weight based on 100 parts by weight of the polyvinyl alcohol from the viewpoint of the prevention of the material for molding an organ model of the present invention from drying, and preferably not more than 300 parts by weight, more preferably not more than 250 parts by weight and still more preferably not more than 200 parts by weight based on 100 parts by weight of the polyvinyl alcohol from the viewpoint of imparting of suitable elasticity to the material for molding an organ model of the present invention.

It is preferable that the polysaccharide is usually used as an aqueous solution from the viewpoint of improvement in dispersibility. An aqueous polysaccharide solution can be obtained by dissolving the polysaccharide in an aqueous solution of an acid such as acetic acid, hydrochloric acid or lactic acid so as to have a concentration of 0.5 to 10% by weight or so. Incidentally, this aqueous solution may be controlled to neutral to basic with a basic substance such as sodium hydroxide or potassium hydroxide as occasion demands.

In addition, additives such as a color rant such as pigment or dye, a flavor, an antioxidant, a fungicide and an antimicrobial can be added to the aqueous polyvinyl alcohol solution in a proper amount within a range which does not hinder an object of the present invention. These additives can be usually added to the aqueous polyvinyl alcohol solution. When the organ model of the present invention is used as, for example, an organ model for exercising an operation such as surgical operation, or cutting and suturing of an human body and the like, it is preferable that the aqueous polyvinyl alcohol solution is colored to a desired color with a colorant in order to give an organ model similar to the organ.

Next, a material for molding an organ model is obtained by freezing the above-mentioned aqueous polyvinyl alcohol solution to a temperature of not more than −10° C., and thawing it.

When an organ model comprising the material for molding an organ model of the present invention is produced, the material for molding an organ model can be produced by, for example, pouring the above-mentioned aqueous polyvinyl alcohol solution into a mold having an inner shape corresponding to the shape of an organ, freezing the above-mentioned aqueous polyvinyl alcohol solution in the mold to a temperature of not more than −10° C., and thawing the formed aqueous gel or crosslinked gel.

Also, when the material for molding an organ model of the present invention is produced in the form of a sheet, for example, the above-mentioned aqueous polyvinyl alcohol solution or the above-mentioned mixed solution is poured into a vessel or the like so as to have a predetermined depth to form a sheet, and thereafter, freezing the formed sheet to a temperature of not more than −10° C. Incidentally, the vessel may be any one of a vessel made of a resin, a vessel made of a metal and the like. The bottom in the vessel may be flat, or may have an inner shape corresponding to the shape of a desired organ model. When a plane sheet is formed, it is preferable that the bottom in the vessel is flat.

The material for molding an organ model of the present invention can be a laminated product of a sheet of the material for molding an organ model and a resin sheet from the viewpoint of increase in mechanical strength and similarity to the surface of an organ of a living body. The laminated product of a sheet of the material for molding an organ model and a resin sheet can be easily produced by placing a resin sheet on the above-mentioned aqueous polyvinyl alcohol solution or the above-mentioned mixed solution, or placing the above-mentioned aqueous polyvinyl alcohol solution or the above-mentioned mixed solution on a resin sheet, and freezing the obtained laminated product of the aqueous polyvinyl alcohol solution or the mixed solution with the resin sheet to a temperature of not more than −10° C.

When a resin sheet is placed on the above-mentioned aqueous polyvinyl alcohol solution or the above-mentioned mixed solution, and the obtained laminated product of the aqueous polyvinyl alcohol solution or the mixed solution and the resin sheet is cooled to a temperature of not more than −10° C., for example, this aqueous polyvinyl alcohol solution or this mixed solution can be poured into a vessel having a flat bottom in a desired depth, and placing a resin sheet thereon, prior to cooling the aqueous polyvinyl alcohol solution or the mixed solution to a temperature of not more than −10° C. In addition, when the above-mentioned aqueous polyvinyl alcohol solution or the above-mentioned mixed solution is placed on the resin sheet, and the obtained laminated product of the aqueous polyvinyl alcohol solution or the mixed solution and the resin sheet is cooled to a temperature of not more than −10° C., for example, a resin sheet is put in a vessel having a flat bottom, and the aqueous polyvinyl alcohol solution or the mixed solution can be poured thereon in a desired depth, prior to cooling the aqueous polyvinyl alcohol solution or the mixed solution to a temperature of not more than −10° C.

It is preferable to use a resin sheet which is excellent in adhesion property to an aqueous gel being formed. A suitable resin sheet includes, for example, a polyvinyl alcohol film, a vinyl chloride resin sheet, a polyvinylidene chloride film, a resin sheet made of a polyolefin such as polyethylene or polypropylene, a polyester film, a polyurethane film, and a polyamide film such as a nylon film, and the like, and the present invention is not limited only to those exemplified ones. Among these resin films, the polyvinyl alcohol film is preferable since the polyvinyl alcohol film is excellent in adhesion property to an aqueous gel or a crosslinked gel being formed. A commercially readily available polyvinyl alcohol film includes, for example, a biaxially oriented film made of polyvinyl alcohol, such as a film commercially available from Nippon Synthetic Chemical Industry Co., Ltd. under the trade name of Bovlon (registered trademark), and the like.

In addition, the above-mentioned resin sheet can be a net-like resin sheet in which many pores are formed. The net-like resin sheet includes, for example, a net-like resin sheet comprising a resin such as polyester, polyurethane or nylon, and the present invention is not limited only to those exemplified ones. The aperture of the net-like resin sheet is not particularly determined, and can be usually 0.1 to 3 mm or so.

The thickness of the resin sheet cannot be absolutely determined since the thickness differs depending on the kind of the resin composing the resin sheet and the like, and is usually 0.03 to 2 mm or so.

The temperature for cooling the above-mentioned aqueous polyvinyl alcohol solution or the above-mentioned mixed solution is not more than −10° C., more preferably not more than −15° C. and still more preferably not more than −20° C. from the viewpoint of increase in mechanical strength of the material for molding an organ model of the present invention, and is preferably not less than −35° C. and more preferably not less than −30° C. from the viewpoint of increase in production efficiency of the material for molding an organ model of the present invention.

The period of time for cooling the aqueous polyvinyl alcohol solution or the mixed solution is preferably 1 to 10 hours or so and more preferably 3 to 8 hours or so from the viewpoint of increase in mechanical strength and production efficiency of the material for molding an organ model of the present invention.

When the above-mentioned aqueous polyvinyl alcohol solution is used, the aqueous polyvinyl alcohol solution is frozen by cooling the aqueous polyvinyl alcohol solution at a desired temperature for a desired period of time. At that time, since the aqueous polyvinyl alcohol solution is gelled, an aqueous gel containing silica particles is formed. Also, when the above-mentioned mixed solution is used, the mixed solution is frozen by cooling the mixed solution at a desired temperature for a desired period of time. At that time, since the mixed solution is gelled, a crosslinked gel containing silica particles is formed.

Next, the aqueous gel containing silica particles or the crosslinked gel containing the silica particles is thawed. The aqueous gel or the crosslinked gel can be naturally thawed by, for example, allowing at room temperature, or can be thawed by heating. From the viewpoint of increase in energy efficiency, natural thawing is preferable. The temperature for thawing the aqueous gel or the crosslinked gel is not particularly limited, and can be usually room temperature to 40° C. or so.

The thawed aqueous gel or the thawed crosslinked gel can be heated as occasion demands. The structure of the aqueous gel constituting the aqueous gel can be homogeneous by heating the thawed aqueous gel or the thawed crosslinked gel. The heating of the aqueous gel or the crosslinked gel can be carried out, for example, in a drying room. The temperature of the aqueous gel or the crosslinked gel is preferably not less than 35° C. and more preferably not less than 40° C. from the viewpoint of homogenization of the structure of the aqueous gel or the crosslinked gel, and preferably not more than 80° C., more preferably not more than 75° C. and still more preferably not more than 70° C. from the viewpoint of suppress of the lowering of gel elasticity. The period of time for controlling the temperature of the aqueous gel or the crosslinked gel cannot be absolutely determined because the period of time differs depending on the temperature, and it is preferable that the period of time is usually 0.5 to 3 hours or so from the viewpoint of homogenization of the structure of the aqueous gel or the crosslinked gel. After the control of the temperature of the aqueous gel or the crosslinked gel, the gel can be allowed to cool to room temperature.

The material for molding an organ model of the present invention is obtained by the above procedures. The material for molding an organ model of the present invention can be used as a material for molding an organ model as it is. However, the material for molding an organ model can be cut so as to have a desired size as occasion demands. In the present invention, an organ model can be produced by pouring the above-mentioned aqueous polyvinyl alcohol solution or the above-mentioned mixed solution into a mold having an inner shape corresponding to the shape of an organ, cooling the aqueous polyvinyl alcohol solution or the mixed solution to a temperature of not more than −10° C., and thawing the formed aqueous gel or crosslinked gel, to produce a model for molding an organ model at the same time of the production of a material for molding an organ model.

Incidentally, according to a conventional process for producing a gel comprising using two kinds of a polyvinyl alcohol, and dimethyl sulfoxide and water as solvents, there is a necessity to repeatedly carry out the freezing and thawing of the aqueous polyvinyl alcohol solution multiple times.

In contrast, according to the present invention, as raw materials, silica particles and polyvinyl alcohol are used together. Therefore, an aqueous gel having a high mechanical strength can be efficiently obtained by carrying out the freezing and thawing of the aqueous polyvinyl alcohol solution or the mixed solution only one time without the conventional procedure such that the freezing and thawing of the aqueous polyvinyl alcohol solution is repeated multiple times. Incidentally, the procedure of the above-mentioned freezing and thawing may be repeated some times as occasion demands.

When the material for molding an organ model of the present invention is produced in the form of a sheet, the thickness of the sheet cannot be absolutely determined since the thickness differs depending on the kind of an organ model, the kind of a cutting tool which is used for cutting the sheet comprising the material for molding an organ model of the present invention, and the like. The thickness of the sheet is usually preferably not less than 0.5 mm and more preferably not less than 1 mm from the viewpoint of improvement in operability to a test for the sharpness of a cutting tool, and preferably not more than 30 mm and more preferably not more than 25 mm from the viewpoint of light-weight and economical efficiency.

When the material for molding an organ model of the present invention is produced in the form of a sheet, this material for molding an organ model having a sheet form can be used as a sheet for exercising an operation.

The cutting tool includes, for example, a scalpel for operation, which is used for exercising an operation such as incision or surgical operation of a human body, or an operation with an endoscope, a surgical excision device such as a surgical knife or a laser knife, and the like, and the present invention is not limited only to those exemplified ones.

The organ model of the present invention can be composed of the material for molding an organ model of the present invention, or may have a surface layer comprising the above-mentioned material for molding an organ model of the present invention. In addition, the surface layer can be composed of only the above-mentioned material for molding an organ model, or may comprise the above-mentioned material for molding an organ model to which an additive and the like are added. Alternatively, the surface layer can be a laminated sheet comprising the above-mentioned material for molding an organ model and a sheet such as a resin sheet or a nonwoven fabric.

It is preferable that the organ model of the present invention has a surface layer comprising the above-mentioned material for molding an organ model, and that the inside thereof is hollow from the viewpoint of similarity to an actual organ as well as weight reduction.

The organ model having a surface layer comprising the above-mentioned material for molding an organ model and a hollow space in its inside can be produced, for example, by forming a surface layer comprising the above-mentioned material for molding an organ model on the surface of a balloon of which inside is hollow, or by bending a sheet comprising the material for molding an organ model to form a cylindrical product, and bonding the ends of the sheet of the cylindrical product with each other.

The above-mentioned balloon forms a base of an organ model. The scale and shape of the balloon cannot be absolutely determined since they differ depending on the kind of an organ. Therefore, it is preferable that the scale and shape of the balloon are properly determined in accordance with the kind of an organ and the like.

The balloon is preferably one which can be easily deformed and which has a hollow space in its inside from the viewpoint of the production of an organ model having an intended shape of an organ. The balloon includes, for example, a balloon made of a resin which can be easily deformed, a balloon made of a rubber such as natural rubber or silicone rubber, and the like. Among them, a balloon made of a rubber represented by a rubber balloon made of, for example, natural rubber or silicone rubber is preferably used since the balloon is stretchable. The thickness of the balloon is not particularly limited, and can be one which enables to produce an organ model having a desired shape of an organ and to easily deform its shape.

A surface layer is formed on the outer surface of the balloon. Therefore, in consideration of the thickness of the surface layer comprising the above-mentioned material for molding an organ model and the like, it is preferable that the size of the balloon is smaller than the size of an intended organ model, and that the size is controlled to form an organ model having an intended size when the surface layer comprising the above-mentioned material for molding an organ model is formed on the outer surface of the balloon.

The organ model having a surface layer comprising the above-mentioned material for molding an organ model and a hollow space in its inside can be produced by, for example, a process comprising wrapping up a balloon having a hollow space in its inside with the above-mentioned material for molding an organ model, removing the excess material for molding an organ model as occasion demands, and bonding the ends of the material for molding with each other; a process comprising forming a cylindrical product by bending a sheet comprising the material for molding an organ model, removing the excess material for molding an organ model as occasion demands, and bonding the ends of the sheet of the cylindrical product with each other, and the like.

The thickness of the sheet comprising the above-mentioned material for molding an organ model is not particularly limited, and it is desired that the thickness is usually 1 to 20 mm or so, preferably 1 to 10 mm or so. The thickness of the sheet comprising the above-mentioned material for molding an organ model can be easily controlled by, for example, rolling the sheet with a roller and the like. When this rolling process is carried out, excess water included in the material for molding an organ model can be easily removed.

The size and shape of the material for molding an organ model cannot be absolutely determined since they differ depending on the kind of an organ model and the like, and therefore, they are not particularly limited. For example, when a balloon is used, it is preferable that the material usually has a size and a shape, which can wrap up a balloon. When a model of an intestine such as a large intestine or a small intestine is produced, it is preferable that the material usually has a size and a shape corresponding to the intestine. In addition, for example, when an organ model having a size and a shape corresponding to an organ is produced from the above-mentioned material for molding an organ model, the material for molding an organ model itself has a size and a shape of the organ model.

When the above-mentioned balloon is used, the balloon can be wrapped up with the material for molding an organ model, and the ends of the material for molding for molding an organ model can be bonded with each other. As a method for bonding the ends of the material, there can be cited, for example, a method for bonding by means of heat seal, a method for bonding with an adhesive, and the like, and the present invention is not limited only to those exemplified ones. Among them, the method for bonding by means of heat seal is preferable since this method does not necessitate an adhesive, and production efficiency is enhanced.

When a balloon which is incorporated in the inside of an organ model is taken out from the organ model prior to bonding the ends of the material for molding an organ model, there can be obtained an organ model which is composed of only the surface layer comprising the material for molding an organ model, and has a hollow space in its inside. In addition, when a balloon which is incorporated in the inside of an organ model is not removed therefrom, there can be obtained an organ model in which the surface layer comprising the material for molding an organ model is formed on the surface of the balloon having a hollow space in its inside. In this case, it is preferable that a resin sheet, a net made of a resin, a nonwoven fabric or the like is provided on the undersurface of the surface layer from the viewpoint of retention of the shape of the surface layer comprising the material for molding an organ model.

When a liquid or a gel as mentioned later is filled in the hollow space inside the organ model in which a resin sheet, a net made of a resin, a nonwoven fabric or the like is provided on the undersurface of the surface layer, it can be prevented that the liquid or the gel being filled therein is directly contacted with the material for molding an organ model forming the surface layer.

The organ model in which a resin sheet having impermeability is provided on the undersurface of the surface layer can be suitably used as an organ model for exercising an operation for confirming whether or not an exercise of operation is appropriately performed, since the resin sheet is broken off, and the liquid or the gel being filled in its inside is leaked out from its operated portion when the depth of the operated portion is too deep due to an improper exercise in operation such as a surgical operation or a cutting and suturing operation for a human body.

In addition, the organ model in which a net made of a resin or a nonwoven fabric is provided on the undersurface of the surface layer can be suitably used as an organ model for exercising an operation for confirming whether or not an exercise of operation is appropriately performed, since the net made of a resin of the nonwoven fabric is broken off, and the improper operation can be confirmed by the feeling of breaking off the net made of a resin or the nonwoven fabric when the depth of the operated portion is too deep due to an improper exercise in operation such as a surgical operation or a cutting and suturing operation for a human body.

In the organ model having a hollow space in its inside, the inside may be hollow depending on the kind of an organ, or can be filled with a liquid or a gel as occasion demands.

When the hollow space inside the organ model is filled with, for example, a liquid having a color similar to blood, there can be produced an organ model, inside of which is filled with a blood-like liquid. This organ model can be suitably used as an organ model for exercising an operation for readily confirming whether or not an exercise of operation is appropriately performed, since the liquid being filled in its inside is leaked out from its operated portion when the depth of the operated portion is too deep due to an improper exercise in operation such as a surgical operation or a cutting and suturing operation for a human body.

In addition, when the hollow space inside the organ model is filled with a gel, there can be obtained an organ model, inside of which is filled with a gel like an organ tissue having a color, hardness and the like similar to an organ tissue which constitutes the organ. This organ model can be suitably used as an organ model for exercising an operation for readily confirming whether or not a practical operation is appropriately performed, since the gel being filled in its inside is leaked out from its operated portion when the depth of the operated portion is too deep due to an improper exercise in operation such as a surgical operation or a cutting and suturing operation for a human body.

The gel being filled in the inside of an organ model is not particularly limited, and a gel having a wide range of a gel strength from a gel having a fluidity to a gel having a high gel strength like a gar can be filled in the hollow space inside the organ model in accordance with the kind of an organ of a living body. The gel includes, for example, a gel obtained by freezing and thawing an aqueous polyvinyl alcohol solution, a gel prepare by absorbing water to a water-absorbing resin, agar, jelly, and the like, and the present invention is not limited only to those exemplified ones. Incidentally, it is preferable to use a gel having a property similar to the tissue of an organ as a gel in accordance with the kind of the organ. In addition, an additive such as a colorant such as pigment or dye, a fragrance, an antioxidant, a fungicide, or an antimicrobial may be added to the gel in an appropriate amount as occasion demands.

An organ model produced by forming a surface layer comprising the material for molding an organ model on the surface of a balloon having a hollow space in its inside can prevent that the liquid or the gel being filled in the hollow space is directly contacted with the material for molding an organ model which forms the surface layer when the liquid or the gel is filled in the hollow space. This organ model can be suitably used as an organ model for exercising an operation for readily confirming whether or not an exercise of operation is appropriately performed, since the liquid or the gel being filled in its inside is leaked out from the operated portion when the depth of the operated portion is too deep due to an improper exercise in an operation such as a surgical operation or a cutting and suturing operation for a human body.

The organ model of the present invention can be one produced by inserting a balloon having a hollow space in its inside into another balloon having a hollow space in its inside, filling a liquid or a gel in the space between these balloons, and forming a surface layer comprising the material for molding an organ model on the outer balloon. This organ model can reduce its weight and cost, since the inside of the inner balloon can be hollow. In this organ model, the outer balloon, the inner balloon, and a liquid or a gel being filled can be the same as mentioned above.

The organ model in which a liquid or a gel is filled between the outer balloon and the inner balloon can be produced by, for example, inserting a balloon having a hollow space in its inside into another balloon having a hollow space in its inside, filling a liquid or a gel in the space between these balloons in a predetermined amount, blowing air or pouring a liquid into the hollow space of the inner balloon to expand the inner balloon, closing the openings of the outer balloon and the inner balloon by means such as binding, and forming a surface layer on the outer balloon in the same manner as mentioned above. This surface layer can be produced by wrapping up this balloon with the material for molding an organ model, removing the excess material for molding an organ model as occasion demands, and bonding their ends with each other.

Incidentally, it is preferable that the organ model of the present invention is produced by forming a surface layer on a base material having a shape corresponding to an organ in its inside from the viewpoint of higher similarity to an actual organ.

The base material having a shape corresponding to an organ in its inside can be produced by, for example, determining the shape and size of an affected organ by means of computed tomography (CT) such as positron emission tomography or magnetic resonance imaging, carrying out a three-dimensional computer processing based on the above data, and processing the base material based on its data, and the like. The above-mentioned base material includes, for example, an epoxy resin having a property to be cured by application of radiation or heat ray, foamed polystyrene to which a cutting or processing can be easily applied, and the like, and the present invention is not limited only to those exemplified ones.

The obtained base material has the same shape as an organ. It is preferable that the size of the base material is controlled to have the same size as an actual organ when a surface layer comprising the material for molding an organ model having the same thickness as the surface layer of the organ is formed on the base material from the viewpoint of approximation to an actual organ.

The organ model produced by forming a surface layer on a base material having a shape corresponding to an organ can be produced by the same manner as the above-mentioned process for producing an organ model obtained by forming a surface layer comprising the material for molding an organ model on the surface of a balloon, for example, a process comprising wrapping up a base material with the material for molding an organ model, removing the excess material for molding an organ model as occasion demands, and bonding their ends with each other.

In the organ model produced by forming a surface layer on a base material having a shape corresponding to an organ, an organ model having a surface layer similar to the organ, and the same size and shape as the organ can be grasped with naked eyes without taking out of an injured organ from a body. Therefore, this organ model is useful not only as an organ model for an operation plan before a surgical operation but also as an organ model for explanation of an operation to a patient, his families and the like prior to the operation.

Incidentally, a vessel or a thin film imitated to a frill, a wrinkle or a blood vessel can be formed on the surface, inside or inner surface of an organ model by using the above-mentioned material for molding an organ model as occasion demands in order to approximate the organ model more closely to an actual organ.

The organ model of the present invention can be produced by using the obtained material for molding an organ model of the present invention.

By using the material for molding an organ model of the present invention, there can be obtained an organ model having excellent properties, such as elasticity similar to an organ of a living body, spreading property at the incised portion like an organ of a living body when the material is incised, water wettability and an incision feel similar to an organ of a living body, little sticky of its surface, low water content, and little swelling when the material being dried is supplied with water. The organ model of the present invention as produced in the above can be suitably used as an organ model for exercising an operation, an organ model for checking the sharpness of an excision implement for an operation, and the like.

The above-mentioned organ model includes, for example, brain, heart, esophagus, stomach, bladder, small intestine, colon, liver, kidney, pancreas, spleen, uterus, and the like, and the present invention is not limited only to those exemplified ones.

Also, since the organ model of the present invention has a incision feel and tactile property similar to a tissue of a living body such as a human skin, the organ model can be used as, for example, an organ model for checking the sharpness of a cutting tool for an operation in order to check the sharpness of a cutting tool for an operation prior to shipping the produced cutting tool for an operation, an organ model for checking the sharpness of a cutting tool for an operation prior to an operation, and the like.

EXAMPLES

Next, the present invention is explained more specifically based on working examples. However, the present invention is not limited only to those examples.

Example I

Production Example 1

Production of Viscous Gel

A beaker having a volume of 1 L was charged with 300 mL of 10% aqueous solution of a polyvinyl alcohol [degree of saponification: 98 to 99% by mole, average degree of polymerization: 1700, available from KURARAY CO., LTD. under the product name: KURARAY POVAL PVA-117] at 25° C., and thereafter 300 mL of a saturated aqueous solution of borax at 25° C. was added to the beaker and stirred to obtain a gel having a fluidity.

About 600 mL of the obtained mixture containing the fluid gel was added to a beaker having a volume of 2 L, in which 600 mL of a saturated aqueous solution of boric acid at 25° C. was charged in advance, and stirred thoroughly to obtain a viscous gel. A water-soluble acrylic paint (available from Delta Creative Inc. under the product name: Delta Ceramcoat) as a coloring agent was added to the obtained viscous gel to colorize the gel to a color similar to blood, and a colored viscous gel was obtained.

Example 1

An aqueous solution polyvinyl alcohol having a viscosity average degree of polymerization of 1700 and a degree of saponification of about 98 to about 99% by mole [available from KURARAY CO., LTD. under the product name: KURARAY POVAL PVA-117] was prepared so as to have a polyvinyl alcohol concentration of 10% by weight. The aqueous solution was stirred with heating to 80° C. for 15 minutes, and thereafter cooled to ordinary temperature. A beaker having a volume of 1 L was charged with 500 mL of the obtained an aqueous polyvinyl alcohol solution.

Next, 15 mL of colloidal silica [available from NISSAN CHEMICAL INDUSTRIES, LTD. under the product name: SNOWTEX XP, particle diameter of silica: about 5 nm, content of silica: 5% by weight] was added to the above-mentioned beaker, and stirred so as to give a homogeneous composition in the beaker.

A translucent acrylic poster color having a chestnut color similar to the color of a stomach of a human body [available from Delta Creative Inc. under the product name: Delta Ceramcoat] was added to the beaker in an amount of 0.5 mL, and stirred to so as to give a homogeneous composition.

The obtained colored aqueous polyvinyl alcohol solution (liquid temperature: 20° C.) was poured into a rectangular parallelepiped resin container made of polypropylene having an internal length of 25 cm, an internal width of 20 cm and an internal height of 7 cm up to a depth of about 2 mm, and a biaxially oriented polyvinyl alcohol film [available from The Nippon Synthetic Chemical Industry Co., Ltd. under the product name: Bovlon (registered trade mark), thickness: about 14 µm] was overlaid on its surface so that air bubbles were not included in the solution.

Next, the above-mentioned resin container was placed in a refrigeration room (room temperature: −20° C.), and cooled for 5 hours. Thereafter, the container was then taken out from the refrigeration room, and allowed to stand at room temperature until the container had room temperature.

Next, the obtained sheet was taken out from the resin container. The sheet was placed in a dryer, heated to 60° C., and then allowed to stand at the same temperature for 10 minutes. Thereafter, the sheet was taken out from the dryer and allowed to cool. The obtained sheet was cut into a size of B5, to produce a material for molding an organ model.

Next, a rubber balloon made of natural rubber being expanded to a size slightly smaller than the size of a stomach of a human body (volume: about 0.8 L) by bowing air into the balloon was produced, and its opening was closed. The rubber balloon was placed on the material for molding an organ model obtained in the above so that the opening of the balloon was faced upward. Thereafter, four corners of the material for molding an organ model were picked up in fingers, and the rubber balloon was wrapped up with the material for molding an organ model. The four corners of the material for molding an organ model were united into one body and tied with a string, and the excess part of the material for molding an organ model was cut with scissors, to give a base material of an organ model having a shape similar to the shape of a pear-shaped stomach.

The portion of the base material where the four corners are united into one body was fused by means of a soldering iron (100 V, 30 W), to form a sealed base material having a bag-like shape. Thereafter, a material for molding an organ model which was produced in the same manner as in the above was superposed on this formed base material of the organ model, to give an organ model having a shape more similar to the shape of a pear-shaped stomach.

Example 2

An organ model was produced in the same manner as in Example 1 except that polyvinyl alcohol having an average degree of polymerization of 1000 and a degree of saponification of about 98 to about 99% by mole [available from KURARAY CO., LTD. under the product name: KURARAY POVAL PVA-110] was used as a polyvinyl alcohol in Example 1.

Example 3

An organ model was produced in the same manner as in Example 1 except that polyvinyl alcohol having an average degree of polymerization of 2000 and a degree of saponification of about 98 to about 99% by mole [available from KURARAY CO., LTD. under the product name: KURARAY POVAL PVA-120] was used as a polyvinyl alcohol in Example 1.

Example 4

An organ model was produced in the same manner as in Example 1 except that the amount of colloidal silica was changed to 1 mL in Example 1.

Example 5

An organ model was produced in the same manner as in Example 1 except that the amount of colloidal silica was changed to 80 mL in Example 1.

Example 6

An organ model was produced in the same manner as in Example 1 except that after the aqueous polyvinyl alcohol solution (liquid temperature: 20° C.) was poured into a resin container, a biaxially oriented polyvinyl alcohol film [available from The Nippon Synthetic Chemical Industry Co., Ltd. under the product name: Bovlon (registered trade mark), thickness: about 14 µm] was not overlaid on its surface in Example 1.

Example 7

An organ model was produced in the same manner as in Example 1 except that a polyester net (basis weight: 50 mg/cm$^2$) was used in place of the biaxially oriented polyvinyl alcohol film [available from The Nippon Synthetic Chemical Industry Co., Ltd. under the product name: Bovlon (registered trade mark), thickness: about 14 µm] in Example 1.

Example 8

An organ model having a shape similar to the shape of a pear-like stomach shape was produced in the same manner as in Example 1. Next, a needle was inserted into the organ model from its surface and the rubber balloon in the organ model burst and shrank. Thereafter, a string was unknotted, and the rubber balloon was taken out from the organ model, to give an organ model not containing a rubber balloon.

Example 9

An organ model was produced in the same manner as in Example 8 except that a polyester net (basis weight: 50 mg/cm$^2$) was used in place of the biaxially oriented polyvinyl alcohol film [available from The Nippon Synthetic Chemical Industry Co., Ltd. under the product name: Bovlon (registered trade mark), thickness: about 14 μm] in Example 8.

Example 10

An organ model was produced in the same manner as in Example 1 except that the rubber balloon was charged with 150 mL of water in place of blowing air into the balloon, and that the rubber balloon which was expanded to a size slightly smaller than the size of a stomach of a human body was used in Example 1. This organ model had a shape similar to the shape of a stomach.

Example 11

An organ model was produced in the same manner as in Example 10 except that a polyester net (basis weight: 5 g/cm$^2$) was used in place of the biaxially oriented polyvinyl alcohol film [available from The Nippon Synthetic Chemical Industry Co., Ltd. under the product name: Bovlon (registered trade mark), thickness: about 14 μm] in Example 10.

Example 12

An organ model was produced in the same manner as in Example 1 except that the rubber balloon was charged with 150 mL of the viscous gel obtained in Production Example 1 in place of blowing air into the balloon, and that the rubber balloon which was expanded to a size slightly smaller than the size of a stomach of a human body was used in Example 1. This organ model had a shape similar to the shape of a stomach.

Example 13

An organ model was produced in the same manner as in Example 12 except that a polyester net (basis weight: 50 mg/cm$^2$) was used in place of the biaxially oriented polyvinyl alcohol film [available from The Nippon Synthetic Chemical Industry Co., Ltd. under the product name: Bovlon (registered trade mark), thickness: about 14 μm] in Example 12.

Example 14

In Example 1, a rubber balloon made of natural rubber was inserted into another rubber balloon made of natural rubber which was the same as the above rubber balloon, and thereby the rubber balloons were double layered. A viscous gel obtained in Production Example 1 in amount of 150 mL was poured into the gap between the outer rubber balloon and the inner rubber balloon, and air was blown into the inner rubber balloon, to expand the outer rubber balloon and the inner rubber balloon. Thereafter, the same procedures as in Example 1 were carried out except that these rubber balloons of which opening was sealed were used, to give an organ model. This organ model had a shape similar to the shape of a stomach.

Example 15

An organ model was produced in the same manner as in Example 14 except that a polyester net (basis weight: 50 mg/cm$^2$) was used in place of the biaxially oriented polyvinyl alcohol film [available from The Nippon Synthetic Chemical Industry Co., Ltd. under the product name: Bovlon (registered trade mark), thickness: about 14 μm] in Example 14.

Example 16

An aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was prepared so as to have a polyvinyl alcohol concentration of 10% by weight. The aqueous solution was stirred with heating at 80° C. for 15 minutes, and allowed to cool to ordinary temperature. A beaker having a volume of 1 L was charged with 500 mL of the obtained aqueous polyvinyl alcohol solution.

Next, 15 mL of colloidal silica [available from NISSAN CHEMICAL INDUSTRIES, LTD. under the product name: SNOWTEX XP, particle diameter of silica: about 5 nm, content of silica: 5% by weight] was added to the beaker, and stirred to make the ingredients in the beaker homogeneous.

A translucent acrylic poster color having a chestnut color similar to the color of a stomach of a human body [available from Delta Creative Inc. under the product name: Delta Ceramcoat] was added to the beaker in an amount of 0.5 mL, and stirred to so as to give a homogeneous composition.

The obtained colored aqueous polyvinyl alcohol solution (liquid temperature: 20° C.) was poured into a rectangular parallelepiped resin container made of polypropylene having an internal length of 25 cm, an internal width of 20 cm and an internal height of 7 cm up to a depth of about 2 mm, and a polyester net (basis weight: 50 mg/cm$^2$) was overlaid on its surface so that air bubbles were not included in the solution.

Next, the above-mentioned resin container was placed in a refrigeration room (room temperature: −20° C.) and cooled for 5 hours. Thereafter, the container was taken out from the refrigeration room and allowed to stand at room temperature until the container had room temperature.

Next, the obtained sheet was taken out from the resin container. The sheet was placed in a dryer, heated to 60° C., and allowed to stand at the same temperature for 10 minutes. Thereafter, the sheet was taken out from the dryer and allowed to cool, to produce a polyvinyl alcohol sheet.

On the other hand, a polyester net (basis weight: 50 mg/cm$^2$) was placed on a flat, stand, and a commercially available laundry starch containing a polyvinyl alcohol as a main component was applied to the polyester net. The polyvinyl alcohol sheet as obtained in the above was overlaid on the polyester net to unite into one body, and rolling was carried out lightly by means of a cylindrical roller from the surface. The obtained sheet was reversed, and the laundry starch was dried by blowing warm wind with a hair drier [available from Panasonic Corporation under the product name: WIND PRESS EH5401], to give a laminated sheet. The obtained laminated sheet was cut into a size of B5, to give a material for molding an organ model.

Next, a rubber balloon made of natural rubber was expanded to a size slightly smaller than the size of a stomach of a human body (volume: about 0.8 L) by blowing air, and its opening was sealed.

The material for molding an organ model obtained in the above was placed on a stand so that the face where the polyester net was provided was faced upward. Thereafter, four corners of the material for molding an organ model were picked up in fingers and the rubber balloon was wrapped up with the material. The four corners were united into one body and tied with a string, and the excess part of the material for molding an organ model was cut with scissors, to give a base material of an organ model having a shape similar to the shape of a pear-shaped stomach.

The portion where the four corners are united into one body of the base material for an organ model was fused by means of a soldering iron (100 V, 30 W), to form a sealed base material having a bag-like shape. Thereafter, a material for molding an organ model which was produced in the same manner as in the above was superposed on this formed base material of the organ model, to give an organ model having a shape more similar to the shape of a pear-shaped stomach.

Example 17

An organ model having a shape similar to the shape of a pear-like stomach shape was produced in the same manner as in Example 16. Next, a needle was inserted into the organ model from its surface and the rubber balloon in the organ model burst and shrank. Thereafter, a string was unknotted, and the rubber balloon was taken out from the organ model, to give an organ model not containing a rubber balloon.

Example 18

An organ model was produced in the same manner as in Example 16 except that the rubber balloon was charged with 150 mL of water in place of blowing air into the balloon, and that the rubber balloon which was expanded to a size slightly smaller than the size of a stomach of a human body was used in Example 16. This organ model had a shape similar to the shape of a stomach.

Example 19

An organ model was produced in the same manner as in Example 16 except that the rubber balloon was charged with 150 mL of the viscous gel obtained in Production Example 1 in place of blowing air into the balloon, and that the rubber balloon which was expanded to a size slightly smaller than the size of a stomach of a human body was used in Example 16. This organ model had a shape similar to the shape of a stomach.

Example 20

In Example 16, a rubber balloon made of natural rubber was inserted into another rubber balloon made of natural rubber which was the same as the above rubber balloon, and thereby the rubber balloons were double layered. A viscous gel obtained in Production Example 1 in amount of 150 mL was poured into the gap between the outer rubber balloon and the inner rubber balloon, and air was blown into the inner rubber balloon, to expand the outer rubber balloon and the inner rubber balloon. Thereafter, the same procedures as in Example 16 were carried out except that these rubber balloons of which opening was sealed were used, to give an organ model. This organ model had a shape similar to the shape of a stomach.

Example 21

An aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was prepared so as to have a polyvinyl alcohol concentration of 10% by weight. The aqueous solution was stirred with heating to 80° C. for 15 minutes, and thereafter cooled to ordinary temperature. A beaker having a volume of 1 L was charged with 500 mL of the obtained aqueous polyvinyl alcohol solution.

Next, 15 mL of colloidal silica [available from NISSAN CHEMICAL INDUSTRIES, LTD. under the product name: SNOWTEX XP, particle diameter of silica: about 5 nm, content of silica: 5% by weight] was added to the above-mentioned beaker, and stirred so as to give a homogeneous composition in the beaker.

A translucent acrylic poster color having a chestnut color similar to the color of a stomach of a human body [available from Delta Creative Inc. under the product name: Delta Ceramcoat] was added to the beaker in an amount of 0.5 mL, and stirred to so as to give a homogeneous composition.

The obtained colored aqueous polyvinyl alcohol solution (liquid temperature: 20° C.) was poured into a rectangular parallelepiped resin container made of polypropylene having an internal length of 25 cm, an internal width of 20 cm and an internal height of 7 cm up to a depth of about 2 mm, and a nylon melt-blown nonwoven fabric (basis weight: 100 $g/m^2$) was overlaid on its surface so that air bubbles were not included in the solution.

Next, the above-mentioned resin container was placed in a refrigeration room (room temperature: −20° C.) and cooled for 5 hours. Thereafter, the container was taken out from the refrigeration room and allowed to stand at room temperature until the container had room temperature.

Next, the obtained sheet was taken out from the resin container, and placed in a dryer. The sheet was heated to 60° C., and allowed to stand at the same temperature for 10 minutes. Thereafter, the sheet was taken out from the dryer, and allowed to cool, to produce a polyvinyl alcohol sheet.

On the other hand, a melt-blown nonwoven fabric made of nylon (basis weight: 100 $g/m^2$) was placed on a flat stand, and a commercially available laundry starch containing polyvinyl alcohol as a main component was applied to the nonwoven fabric. The polyvinyl alcohol sheet as obtained in the above was overlaid on the nonwoven fabric to unite into one body, and rolling was carried out lightly by means of a cylindrical roller from the surface. The obtained sheet was reversed, and the laundry starch was dried by blowing warm wind with a hair drier [available from Panasonic Corporation under the product name: WIND PRESS EH5401], to give a laminated sheet. The obtained laminated sheet was cut into a size of B5, to give a material for molding an organ model.

Next, a rubber balloon made of natural rubber being expanded to a size slightly smaller than the size of a stomach of a human body (volume: about 0.8 L) by bowing air into the balloon was produced, and its opening was closed.

The material for molding an organ model obtained in the above was placed on a stand so that the opening being sealed was faced upward. Thereafter, four corners of the material for molding an organ model were picked up in fingers and the rubber balloon was wrapped up with the material. The four corners were united into one body and tied with a string, and the excess part of the material for molding an organ model was cut with scissors, to give a base material of an organ model having a shape similar to the shape of a pear-shaped stomach.

The portion where the four corners are united into one body of the base material for an organ model was fused by means of a soldering iron (100 V, 30 W), to form a sealed base material having a bag-like shape. Thereafter, a material for molding an organ model which was produced in the same manner as in the above was superposed on this formed base material of the organ model, to give an organ model having a shape more similar to the shape of a pear-shaped stomach.

Example 22

An organ model having a shape similar to the shape of a pear-like stomach shape was produced in the same manner as in Example 21. Next, a needle was inserted into the organ model from its surface and the rubber balloon in the organ model burst and shrank. Thereafter, a string was unknotted, and the rubber balloon was taken out from the organ model, to give an organ model not containing a rubber balloon.

Example 23

An organ model was produced in the same manner as in Example 21 except that the rubber balloon was charged with 150 mL of water in place of blowing air into the balloon, and that the rubber balloon expanded to a size slightly smaller than the size of a stomach of a human body was used in Example 21. This organ model had a shape similar to the shape of a stomach.

Example 24

An organ model was produced in the same manner as in Example 21 except that the rubber balloon was charged with 150 mL of the viscous gel obtained in Production Example 1 in place of blowing air into the balloon, and that the rubber balloon which was expanded to a size slightly smaller than the size of a stomach of a human body was used in Example 21. This organ model had a shape similar to the shape of a stomach.

Example 25

In Example 21, a rubber balloon made of natural rubber was inserted into another rubber balloon made of natural rubber, which was the same as the above rubber balloon, and thereby the rubber balloons were double layered. A viscous gel obtained in Production Example 1 in amount of 150 mL was poured into the gap between the outer rubber balloon and the inner rubber balloon, and air was blown into the inner rubber balloon, to expand the outer rubber balloon and the inner rubber balloon. Thereafter, the same procedures as in Example 21 were carried out except that these rubber balloons of which opening was sealed were used, to give an organ model. This organ model had a shape similar to the shape of a stomach.

Comparative Example 1

An organ model was produced in the same manner as in Example 1 except that the colloidal silica being used in Example 1 was not used.

Comparative Example 2

A polyvinyl alcohol powder (average degree of polymerization: 1700, degree of saponification: 99.0% by mole) in an amount of 80 g was mixed with a polyvinyl alcohol powder (average degree of polymerization: 1800, degree of saponification: 86 to 90% by mole) in an amount of 20 g, to obtain a polyvinyl alcohol mixture. The obtained polyvinyl alcohol mixture was dissolved in a mixed solvent of dimethyl sulfoxide and water [dimethyl sulfoxide/water (weight ratio): 80/20] with heating at 120° C., to prepare a polyvinyl alcohol solution having a water content of 80% by weight.

The obtained polyvinyl alcohol solution was poured into a resin container made of polypropylene having a volume of 200 mL, and thereafter, the resin container was cooled to room temperature.

The contents of the resin container were immersed in 200 mL of ethanol at room temperature for 2 hours, and thereby the dimethyl sulfoxide was replaced with ethanol, to remove the dimethyl sulfoxide. The contents of the resin container were immersed in water, and then the contents were taken out from the resin container.

The contents were observed. As a result, the contents were not sufficiently gelled, had little elasticity and fluidity, and was sticky on its surface. Therefore, an organ model could not be produced from the contents.

Accordingly, it can be understood that a gel having elasticity cannot be produced, even though a polyvinyl alcohol having an average degree of polymerization of 1700 and a degree of saponification of 99.0% by mole is mixed with a polyvinyl alcohol having an average degree of polymerization of 1800 and a degree of saponification of 86 to 90% by mole in a weight ratio of 80/20, the resulting mixture is dissolved in a mixed solvent of water and dimethyl sulfoxide, and cooled to room temperature.

Comparative Example 3

A gel and an organ model was produced in the same manner as in Comparative Example 1 except that after a resin container made of polypropylene having a volume of 200 mL was charged with the polyvinyl alcohol solution, the temperature for cooling this resin container was changed from room temperature to −20° C., and that the solution was frozen at this temperature for 24 hours and thawed by restoring to room temperature. As a result, a gel was obtained, which was different from as in the case of Comparative Example 1. However, it was confirmed that the gel had a low elasticity and was sticky on its surface.

Comparative Example 4

A material for molding an organ model was produced by cutting a commercially available silicone rubber sheet having a thickness of 4 mm into a size of B5.

As a conventional organ model, the material for molding an organ model obtained in the above was used, and an organ model was produced in the same manner as in Example 1 by using the material for molding an organ model obtained in the above.

Experimental Example 1

As the physical properties of an organ model obtained in each example and each comparative example, appearance, water wettability (hydrophilic property), an incision feel, incision property, stickiness, elasticity, water content and water absorbency after drying were examined in accordance with the following methods. The results are shown in Table 1.

(1) Appearance

Ten students and instructors majoring in surgery in a graduate school of medicine of university observed the appearance of an organ model, and the appearance was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (2) Water Wettability A flat plate made of a resin which constitutes the surface layer of each organ model was produced. As an evaluation of the water wettability, a contact angle of water to the plate was determined at 25° C. in an atmosphere by means of a contact angle mater [available from Kyowa Interface Science Co., Ltd. under the product number: CA-X] when 5 seconds passed from the contact of the water.

(3) Incision Feel

Ten students and instructors majoring in surgery in a graduate school of medicine of university actually performed an operation on an organ model by using a surgical scalpel [available from FEATHER Safety Razor Co., Ltd., stainless steel surgical blade scalpel No. 10] for examining an incision feel, and the incision feel was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (4) Incision Property Ten students and instructors majoring in surgery in a graduate school of medicine of university actually performed an operation on an organ model by using a surgical scalpel [available from FEATHER Safety Razor Co., Ltd., stainless steel surgical blade scalpel No. 10] and observed whether or not the wound of the incised portion extends similarly to an organ of a living body, and incision property was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (5) Stickiness Ten students and instructors majoring in surgery in a graduate school of medicine of university touched an organ model with fingers to examine its stickiness, and the stickiness was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (6) Elasticity Ten students and instructors majoring in surgery in a graduate school of medicine of university touched an organ model with fingers to examine its elasticity, and the elasticity was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (7) Water Content The mass of an organ model was determined, and the organ model was dried in a dryer at 40° C. until the change of mass was no longer observed. Thereafter, the water content was determined in accordance with the equation:

[Water content]=[(mass of an organ model before drying)−(mass of an organ model after drying)]÷(mass of an organ model before drying)×100.

(8) Water Absorbency after Drying

The organ model dried in the above-mentioned "(7) Water content" was immersed in water at 25° C. for 10 minutes, and the organ model was taken out from the water. Thereafter, the water absorbency after drying was compared with the organ model before drying, and evaluated in accordance with the following evaluation criteria. Incidentally, the fact that no one gives an evaluation of "D" is an acceptance criterion.

[Evaluation Criteria]
A: Having a surface layer similar to an organ model before drying
B: Having a surface layer not swollen in comparison with an organ model before drying
C: Having a surface layer slightly swollen in comparison with an organ model before drying
D: Having a surface layer considerably swollen in comparison with an organ model before drying In Comparative Example 1, the physical properties of an organ model could not be determined, because a gel could not be produced.

TABLE 1

Physical properties of organ model

| Example No. | Appearance | | | | Water wettability [contact angle degree)] | Incision feel | | | | Incision property | | | | Stickiness | | | | Elasticity | | | | Water content (%) | Water absorbency after drying |
|---|---|---|---|---|---|---|---|---|---|---|---|---|---|---|---|---|---|---|---|---|---|---|---|
| | A | B | C | D | | A | B | C | D | A | B | C | D | A | B | C | D | A | B | C | D | | |
| 1 | 8 | 1 | 1 | 0 | 0 | 5 | 4 | 1 | 0 | 8 | 1 | 1 | 0 | 3 | 6 | 1 | 0 | 7 | 2 | 1 | 0 | 72.2 | A |
| 2 | 7 | 0 | 3 | 0 | 0 | 4 | 4 | 2 | 0 | 8 | 1 | 1 | 0 | 6 | 3 | 1 | 0 | 6 | 2 | 2 | 0 | 72.2 | A |
| 3 | 8 | 2 | 0 | 0 | 0 | 4 | 5 | 1 | 0 | 7 | 1 | 2 | 0 | 6 | 3 | 1 | 0 | 3 | 6 | 1 | 0 | 72.0 | A |
| 4 | 7 | 1 | 2 | 0 | 0 | 5 | 4 | 1 | 0 | 8 | 2 | 0 | 0 | 6 | 2 | 2 | 0 | 2 | 6 | 2 | 0 | 72.1 | A |
| 5 | 7 | 2 | 1 | 0 | 0 | 7 | 1 | 2 | 0 | 7 | 1 | 2 | 0 | 6 | 1 | 3 | 0 | 5 | 1 | 4 | 0 | 73.0 | A |
| 6 | 8 | 1 | 1 | 0 | 0 | 7 | 2 | 1 | 0 | 6 | 3 | 1 | 0 | 5 | 2 | 3 | 0 | 3 | 0 | 7 | 0 | 72.7 | A |
| 7 | 6 | 2 | 2 | 0 | 0 | 6 | 3 | 1 | 0 | 6 | 3 | 1 | 0 | 5 | 3 | 2 | 0 | 6 | 2 | 2 | 0 | 72.2 | A |
| 8 | 8 | 1 | 1 | 0 | 0 | 6 | 3 | 1 | 0 | 7 | 2 | 1 | 0 | 7 | 2 | 1 | 0 | 4 | 5 | 1 | 0 | 73.1 | A |

TABLE 1-continued

| | | | | | | Physical properties of organ model | | | | | | | | | | | | | | | | |
|---|---|---|---|---|---|---|---|---|---|---|---|---|---|---|---|---|---|---|---|---|---|---|
| Example No. | Appearance | | | | Water wettability [contact angle (degree)] | Incision feel | | | | Incision property | | | | Stickiness | | | | Elasticity | | | | Water content (%) | Water absorbency after drying |
| | A | B | C | D | | A | B | C | D | A | B | C | D | A | B | C | D | A | B | C | D | | |
| 9 | 7 | 1 | 2 | 0 | 0 | 5 | 3 | 2 | 0 | 5 | 3 | 2 | 0 | 6 | 3 | 1 | 0 | 5 | 3 | 2 | 0 | 72.0 | A |
| 10 | 8 | 1 | 1 | 0 | 0 | 4 | 3 | 3 | 0 | 8 | 1 | 1 | 0 | 4 | 3 | 3 | 0 | 8 | 0 | 2 | 0 | 72.6 | A |
| 11 | 7 | 1 | 2 | 0 | 0 | 7 | 2 | 1 | 0 | 7 | 2 | 1 | 0 | 7 | 3 | 0 | 0 | 5 | 4 | 1 | 0 | 72.3 | A |
| 12 | 6 | 2 | 2 | 0 | 0 | 5 | 3 | 2 | 0 | 6 | 3 | 1 | 0 | 3 | 3 | 4 | 0 | 4 | 2 | 4 | 0 | 72.9 | A |
| 13 | 7 | 1 | 2 | 0 | 0 | 4 | 3 | 3 | 0 | 7 | 3 | 0 | 0 | 1 | 3 | 2 | 0 | 6 | 1 | 3 | 0 | 72.8 | A |
| 14 | 8 | 2 | 0 | 0 | 0 | 3 | 4 | 3 | 0 | 8 | 2 | 0 | 0 | 4 | 3 | 3 | 0 | 5 | 2 | 3 | 0 | 73.0 | A |
| 16 | 5 | 1 | 4 | 0 | 0 | 5 | 3 | 2 | 0 | 8 | 1 | 1 | 0 | 6 | 2 | 2 | 0 | 7 | 2 | 1 | 0 | 72.7 | A |
| 16 | 6 | 3 | 1 | 0 | 0 | 4 | 3 | 3 | 0 | 7 | 1 | 2 | 0 | 5 | 1 | 4 | 0 | 7 | 2 | 1 | 0 | 72.6 | A |
| 17 | 3 | 2 | 5 | 0 | 0 | 3 | 6 | 1 | 0 | 4 | 4 | 2 | 0 | 5 | 2 | 3 | 0 | 5 | 2 | 3 | 0 | 72.3 | A |
| 18 | 2 | 3 | 5 | 0 | 0 | 5 | 4 | 1 | 0 | 5 | 4 | 1 | 0 | 8 | 2 | 0 | 0 | 4 | 3 | 3 | 0 | 73.0 | A |
| 19 | 6 | 1 | 3 | 0 | 0 | 7 | 2 | 1 | 0 | 3 | 4 | 3 | 0 | 4 | 3 | 3 | 0 | 3 | 4 | 3 | 0 | 72.6 | A |
| 20 | 5 | 1 | 4 | 0 | 0 | 5 | 4 | 1 | 0 | 7 | 1 | 2 | 0 | 5 | 1 | 4 | 0 | 6 | 2 | 2 | 0 | 72.5 | A |
| 21 | 6 | 1 | 3 | 0 | 0 | 4 | 4 | 2 | 0 | 6 | 3 | 1 | 0 | 2 | 6 | 2 | 0 | 7 | 1 | 2 | 0 | 72.7 | A |
| 22 | 7 | 1 | 2 | 0 | 0 | 3 | 4 | 3 | 0 | 5 | 2 | 3 | 0 | 4 | 4 | 2 | 0 | 7 | 1 | 2 | 0 | 72.6 | A |
| 23 | 6 | 2 | 2 | 0 | 0 | 8 | 1 | 1 | 0 | 5 | 2 | 3 | 0 | 6 | 2 | 2 | 0 | 6 | 2 | 2 | 0 | 72.7 | A |
| 24 | 5 | 3 | 2 | 0 | 0 | 6 | 3 | 1 | 0 | 6 | 2 | 2 | 0 | 9 | 0 | 1 | 0 | 5 | 4 | 1 | 0 | 73.1 | A |
| 25 | 6 | 3 | 1 | 0 | 0 | 4 | 4 | 2 | 0 | 7 | 2 | 1 | 0 | 4 | 5 | 1 | 0 | 3 | 5 | 2 | 0 | 72.8 | A |
| Comparative Example | | | | | | | | | | | | | | | | | | | | | | | |
| 1 | 2 | 3 | 5 | 0 | 19 | 0 | 1 | 1 | 8 | 0 | 0 | 1 | 9 | 0 | 0 | 1 | 9 | 0 | 0 | 2 | 8 | 72.4 | D |
| 2 | — | — | — | — | — | — | — | — | — | — | — | — | — | — | — | — | — | — | — | — | — | — | — |
| 3 | 0 | 1 | 4 | 5 | 40 | 1 | 1 | 3 | 5 | 0 | 1 | 3 | 6 | 0 | 0 | 1 | 9 | 0 | 0 | 1 | 9 | 18.8 | A |
| 4 | 3 | 6 | 1 | 0 | 105 | 0 | 1 | 1 | 8 | 0 | 0 | 2 | 8 | 2 | 2 | 4 | 2 | 3 | 3 | 3 | 1 | — | — |

From the result shown in Table 1, it can be seen that each organ model obtained in each example shows excellent effects such as no stickiness of the surface, low water content and little swelling when an organ model being dried is supplied with water as well as elasticity similar to an organ of a living body, extension similar to an organ of a living body, water wettability and an incision feel similar to an organ of a living body.

Experimental Example 2

A sheet (thickness: 2 mm) produced from the material for molding an organ model obtained in Example 1 or the material for molding an organ model obtained in Comparative Example 3, which was separately produced, was cut into a dumbbell form of 5 mm in width, to give three samples per each material. The sample was drawn at a rate of 1 mm/minute by means of a tensile tester [available from Shimadzu Corporation under the product name: Autograph AGS-5 kNG], and strength at the time of rupture (breaking strength) was measured. The average value of the breaking strength for three samples of each material was calculated.

As a result, the breaking strength of the surface layer obtained in Example 1 was 0.5 N/mm². In contrast, the breaking strength of the surface layer obtained in Comparative Example 3 was 1.1 N/mm². This fact demonstrates that the material for molding an organ model obtained in Example 1 has a moderate strength, while the material for molding an organ model obtained in Comparative Example 3 has a very high strength and hardness.

Example 26

An aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was prepared so as to have a polyvinyl alcohol concentration of 10% by weight. The aqueous solution was stirred with heating to 80° C. for 15 minutes, and thereafter cooled to ordinary temperature. A beaker having a volume of 1 L was charged with 500 mL of the obtained aqueous polyvinyl alcohol solution.

Next, 15 mL of colloidal silica [available from NISSAN CHEMICAL INDUSTRIES, LTD. under the product name: SNOWTEX XP, particle diameter of silica: about 5 nm, content of silica: 5% by weight] was added to the above-mentioned beaker, and stirred so as to give a homogeneous composition in the beaker.

A translucent acrylic poster color having a chestnut color similar to a liver of a human body [available from Delta Creative Inc. under the product name: Delta Ceramcoat] was added to the beaker in an amount of 0.5 mL, and stirred to so as to give a homogeneous composition.

A mold having an inner surface having a shape corresponding to the shape of a human liver (a separated mold having an upper mold and a lower mold) was produced from plaster. A mold releasing agent was applied to the inner surface of the mold, and the mold was closed by contacting the upper mold with the lower mold. A colored aqueous polyvinyl alcohol solution (liquid temperature: 20° C.) obtained in the above was poured into the mold through an injection hole provided in the upper mold.

Next, the above-mentioned mold was placed in a refrigeration room (room temperature: −20° C.), and cooled for 5 hours. Thereafter, the mold was taken out from the refrigeration room, and allowed to stand until the mold had room temperature.

Next, the mold was placed in a dryer and heated up to 60° C., and its temperature was maintained for 10 minutes. Thereafter, the mold was taken out from the dryer, and allowed to cool. The mold was opened, and an obtained organ model (length: about 15 cm, width: about 10 cm) was taken out from the mold.

The obtained organ model is shown in FIG. 1. FIG. 1 is a photograph substituted for a drawing of the organ model obtained in the above. As shown in FIG. 1, it can be seen that the obtained organ model has a shape similar to the shape of the liver of a human body.

Next, appearance, water wettability (hydrophilic property), an incision feel, incision property, stickiness, elasticity, water content and water absorbency after drying of the organ model obtained in the above, which had a shape similar to the shape of the liver of a human body, were examined in the same manner as in Example 1. As a result, it was confirmed that the organ model had the same physical properties as an organ model obtained in Example 1.

In addition, when a surgeon observed the organ model obtained in the above, which had a shape similar to the shape of the liver of a human body, he has evaluated that this organ model was similar to a liver of a human body, and suited for exercising for an operation such as an incision operation, or a cutting and suturing operation of a human body.

Example 27

An aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was prepared so as to have a polyvinyl alcohol concentration of 10% by weight . The aqueous solution was stirred with heating to 80° C. for 15 minutes, and thereafter cooled to ordinary temperature. A beaker having a volume of 1 L was charged with 500 mL of the obtained aqueous polyvinyl alcohol solution.

Next, 15 mL of colloidal silica [available from NISSAN CHEMICAL INDUSTRIES, LTD. under the product name: SNOWTEX XP, particle diameter of silica: about 5 nm, content of silica: 5% by weight] was added to the above-mentioned beaker, and stirred so as to give a homogeneous composition in the beaker.

A translucent acrylic poster color having a chestnut color similar to the color of a small intestine of a human body [available from Delta Creative Inc. under the product name: Delta Ceramcoat] was added to the beaker in an amount of 0.5 mL, and stirred to so as to give a homogeneous composition.

The obtained colored aqueous polyvinyl alcohol solution (liquid temperature: 20° C.) was poured into a rectangular parallelepiped resin container made of polypropylene having an internal length of 25 cm, an internal width of 20 cm and an internal height of 7 cm up to a depth of about 5 mm, and a biaxially oriented polyvinyl alcohol film [available from The Nippon Synthetic Chemical Industry Co., Ltd. under the product name: Bovlon (registered trade mark), thickness: about 14 μm] was overlaid on its surface so that air bubbles were not included in the solution.

Next, the above-mentioned resin container was placed in a refrigeration room (room temperature: −20° C.) and cooled for 5 hours. Thereafter, the container was taken out from the refrigeration room and allowed to stand at room temperature until the container had room temperature. The obtained sheet was taken out from the resin container, and placed in a dryer. The sheet was heated to 60° C., and allowed to stand at the same temperature for 10 minutes. Thereafter, the sheet was taken out from the dryer and allowed to cool. The obtained sheet was cut into a size of 15 cm in length and 6 cm in width, to produce a material for molding an organ model.

Next, the obtained material for molding an organ model was curved in the short side direction to form a cylindrical shape so that the biaxially oriented polyvinyl alcohol film forms the outer surface. An aqueous polyvinyl alcohol solution obtained in the above was applied to the ends of the long side for conjunction in order to bond the ends of the long side with each other, and thereafter, freezing and thawing of the material were carried out in the same manner as in the above, to give an organ model having a shape of a small intestine.

The obtained organ model is shown in FIG. 2. FIG. 2 is a photograph substituted for a drawing of the organ model obtained in the above. As shown in FIG. 2, it can be seen that the obtained organ model has a shape similar to the shape of a small intestine of a human body.

As the physical properties, appearance, water wettability (hydrophilic property) of the inner surface, an incision feel, incision property, stickiness of the inner surface, elasticity, water content of the inner surface and water absorbency after drying of the inner surface of the obtained organ model were examined in the same manner as in Example 1. As a result, it was confirmed that the organ model has the same physical properties as an organ model obtained in Example 1.

From the above results, it is can be seen that the organ model of the present invention obtained in [Example I] can be suitably used as an organ model for exercising an operation such as incision operation, or a cutting and suturing operation of a human body, an organ model for exercising an operation such as an operation with an endoscope, an organ model for checking the sharpness of a surgical excision tool, and the like.

Example II

Production Example 1

Production of Viscous Gel

A beaker having a volume of 1 L was charged with 300 mL of 10% aqueous solution of a polyvinyl alcohol [degree of saponification: 98 to 99% by mole, average degree of polymerization: 1700, available from KURARAY CO., LTD. under the product name: KURARAY POVAL PVA-117] at 25° C., and thereafter 300 mL of a saturated aqueous solution of borax at 25° C. was added to the beaker and stirred to obtain a gel having a fluidity.

About 600 mL of the obtained fluid gel was added to a beaker having a volume of 2 L, in which 600 mL of a saturated aqueous solution of boric acid at 25° C. was charged in advance, and stirred thoroughly to obtain a viscous gel. A water-soluble acrylic paint (available from Delta Creative Inc. under the product name: Delta Ceramcoat) as a coloring agent was added to the obtained viscous gel to colorize the gel to a color similar to blood, and a colored viscous gel was obtained.

Example 1

A beaker having a volume of 500 mL was charged with 160 mL of dimethyl sulfoxide and 40 mL of water, and mixed thoroughly to prepare a mixed solvent. To 100 mL of the obtained mixed solvent in the beaker was added 40 mL of colloidal silica [available from NISSAN CHEMICAL INDUSTRIES, LTD. under the product name: SNOWTEX XP, particle diameter of silica: about 5 nm, content of silica: 5% by weight], and stirred so that the contents of the beaker had a homogeneous composition.

Next, an aqueous solution of a polyvinyl alcohol having an average degree of polymerization of 1700 and a degree of saponification of about 98 to about 99% by mole [available from KURARAY CO., LTD. under the product name: KURARAY POVAL PVA-117] was added to the above-mentioned beaker so as to have a polyvinyl alcohol concentration of 10% by weight. The ingredients were stirred with heating to 80° C. for 15 minutes, and a mixed solution was obtained.

To the obtained mixed solution, 1 mL of a translucent acrylic poster color having a chestnut color similar to the color of a stomach of a human body [available from Delta Creative Inc. under the product name: Delta Ceramcoat] was added so as to give a homogeneous composition.

The obtained colored mixed solution (liquid temperature: 20° C.) was poured into a rectangular parallelepiped resin container made of polypropylene having an internal length of 25 cm, an internal width of 20 cm and an internal height of 7 cm up to a depth of about 2 mm, and a biaxially oriented polyvinyl alcohol film [available from The Nippon Synthetic Chemical Industry Co., Ltd. under the product name: Bovlon (registered trade mark), thickness: about 14 μm] was overlaid on its surface so that air bubbles were not included in the solution.

Next, the above-mentioned resin container was placed in a refrigeration room (room temperature: −20° C.) and cooled for 5 hours. The mold was then taken out from the refrigeration room, and allowed to stand at room temperature until the container had room temperature.

Next, the obtained sheet was taken out from the resin container, and placed in a dryer. The sheet was heated to 60° C., and allowed to stand at the same temperature for 10 minutes. Thereafter, the sheet was taken out from the dryer and allowed to cool. The obtained sheet was cut into a size of B5, to produce a material for molding an organ model.

Next, a rubber balloon made of natural rubber being expanded to a size slightly smaller than the size of a stomach of a human body (volume: about 0.8 L) by bowing air into the balloon was produced, and its opening was closed. The rubber balloon was placed on the material for molding an organ model obtained in the above so that the opening of the balloon was faced upward. Thereafter, four corners of the material for molding an organ model were picked up in fingers, and the rubber balloon was wrapped up with the material. The four corners were united into one body and tied with a string, and the excess part of the material for molding an organ model was cut with scissors, to give a base material of an organ model having a shape similar to the shape of a pear-shaped stomach.

The portion where the four corners are united into one body of the base material for an organ model was fused by means of a soldering iron (100 V, 30 W), to form a sealed base material having a bag-like shape. Thereafter, a material for molding an organ model which was produced in the same manner as in the above was superposed on this formed base material of the organ model, to give an organ model having a shape more similar to the shape of a pear-shaped stomach.

Example 2

An organ model was produced in the same manner as in Example 1 except that polyvinyl alcohol having an average degree of polymerization of 1000 and a degree of saponification of about 98 to about 99% by mole [available from KURARAY CO., LTD. under the product name: KURARAY POVAL PVA-110] was used as a polyvinyl alcohol in Example 1. This organ model had a shape similar to the shape of a stomach.

Example 3

An organ model was produced in the same manner as in Example 1 except that polyvinyl alcohol having an average degree of polymerization of 2000 and a degree of saponification of about 98 to about 99% by mole [available from KURARAY CO., LTD. under the product name: KURARAY POVAL PVA-120] was used as a polyvinyl alcohol in Example 1. This organ model had a shape similar to the shape of a stomach.

Example 4

An organ model was produced in the same manner as in Example 1 except that the amount of colloidal silica was changed to 2 mL in Example 1. This organ model had a shape similar to the shape of a stomach.

Example 5

An organ model was produced in the same manner as in Example 1 except that the amount of colloidal silica was changed to 160 mL in Example 1. This organ model had a shape similar to the shape of a stomach.

Example 6

An organ model was produced in the same manner as in Example 1 except that after the mixed solution (liquid temperature: 20° C.) was poured into a resin container, a biaxially oriented polyvinyl alcohol film was not overlaid on its surface in Example 1. This organ model had a shape similar to the shape of a stomach.

Example 7

An organ model was produced in the same manner as in Example 1 except that a polyester net (basis weight: 50 mg/cm$^2$) was used in place of the biaxially oriented polyvinyl alcohol film in Example 1. This organ model had a shape similar to the shape of a stomach.

Example 8

An organ model having a shape similar to the shape of a pear-like stomach shape was produced in the same manner as in Example 1. Next, a needle was inserted into the organ model from its surface and the rubber balloon in the organ model burst and shrank. Thereafter, a string was unknotted, and the rubber balloon was taken out from the organ model, to give an organ model not containing a rubber balloon. This organ model had a shape similar to the shape of a stomach.

Example 9

An organ model was produced in the same manner as in Example 8 except that a polyester net (basis weight: 50 mg/cm$^2$) was used in place of the biaxially oriented polyvinyl alcohol film in Example 8. This organ model had a shape similar to the shape of a stomach.

Example 10

An organ model was produced in the same manner as in Example 1 except that the rubber balloon was charged with 150 mL of water in place of blowing air into the balloon, and that the rubber balloon which was expanded to a size slightly smaller than the size of a stomach of a human body was used in Example 1. This organ model had a shape similar to the shape of a stomach.

Example 11

An organ model was produced in the same manner as in Example 10 except that a polyester net (basis weight: 5 g/cm$^2$) was used in place of the biaxially oriented polyvinyl alcohol film in Example 10. This organ model had a shape similar to the shape of a stomach.

Example 12

An organ model was produced in the same manner as in Example 1 except that the rubber balloon was charged with 150 mL of the viscous gel obtained in Production Example 1 in place of blowing air into the balloon, and that the rubber balloon which was expanded to a size slightly smaller than the size of a stomach of a human body was used in Example 1. This organ model had a shape similar to the shape of a stomach.

Example 13

An organ model was produced in the same manner as in Example 12 except that a polyester net (basis weight: 50 mg/cm$^2$) was used in place of the biaxially oriented polyvinyl alcohol film in Example 12. This organ model had a shape similar to the shape of a stomach.

Example 14

In Example 1, a rubber balloon made of natural rubber was inserted into another rubber balloon made of natural rubber, which was the same as the above rubber balloon, and thereby the rubber balloons were double layered. A viscous gel obtained in Production Example 1 in amount of 50 mL was poured into the gap between the outer rubber balloon and the inner rubber balloon, and air was blown into the inner rubber balloon, to expand the outer rubber balloon and the inner rubber balloon. Thereafter, the same procedures as in Example 1 were carried out except that these rubber balloons of which opening was sealed were used, to give an organ model. This organ model had a shape similar to the shape of a stomach.

Example 15

An organ model was produced in the same manner as in Example 14 except that a polyester net (basis weight: 50 mg/cm$^2$) was used in place of the biaxially oriented polyvinyl alcohol film in Example 14. This organ model had a shape similar to the shape of a stomach.

Example 16

A beaker having a volume of 500 mL was charged with 160 mL of dimethyl sulfoxide and 40 mL of water, and mixed thoroughly to prepare a mixed solvent. To 200 mL of the obtained mixed solvent in the beaker was added 40 mL of colloidal silica [available from NISSAN CHEMICAL INDUSTRIES, LTD. under the product name: SNOWTEX XP, particle diameter of silica: about 5 nm, content of silica: 5% by weight], and stirred so that the contents of the beaker had a homogeneous composition.

Next, an aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was added to the above-mentioned beaker so as to have a polyvinyl alcohol concentration of 10% by weight. The ingredients were stirred with heating to 80° C. for 15 minutes, and a mixed solution was obtained.

To the obtained mixed solution, 1 mL of a translucent acrylic poster color having a chestnut color similar to the color of a stomach of a human body [available from Delta Creative Inc. under the product name: Delta Ceramcoat] was added so as to give a homogeneous composition.

The obtained colored mixed solution (liquid temperature: 20° C.) was poured into a rectangular parallelepiped resin container made of polypropylene having an internal length of 25 cm, an internal width of 20 cm and an internal height of 7 cm up to a depth of about 2 mm, and a polyester net (basis weight: 50 mg/cm$^2$) was overlaid on its surface so that air bubbles were not included in the solution.

Next, the above-mentioned resin container was placed in a refrigeration room (room temperature: −20° C.) and cooled for 5 hours, and then taken out from the refrigeration room and allowed to stand at room temperature, to produce a polyvinyl alcohol sheet.

On the other hand, a polyester net (basis weight: 50 mg/cm$^2$) was placed on a flat stand, and a commercially available laundry starch containing polyvinyl alcohol as a main component was applied to the polyester net. The polyvinyl alcohol sheet as obtained in the above was overlaid on the polyester net to unite into one body, and rolling was carried out lightly by means of a cylindrical roller from the surface. The obtained sheet was reversed, and the laundry starch was dried by blowing warm wind with a hair drier [available from Panasonic Corporation under the product name: WIND PRESS EH5401], to give a laminated sheet. The obtained laminated sheet was cut into a size of B5, to give a material for molding an organ model.

Next, a rubber balloon made of natural rubber was expanded to a size slightly smaller than the size of a stomach of a human body (volume: about 0.8 L) by blowing air, and its opening was sealed.

The material for molding an organ model obtained in the above was placed on a stand so that the face where the polyester net was provided was faced upward. Thereafter, four corners of the material for molding an organ model were picked up in fingers and the rubber balloon was wrapped up with the material. The four corners were united into one body and tied with a string, and the excess part of the material for molding an organ model was cut with scissors, to give a base material of an organ model having a shape similar to the shape of a pear-shaped stomach.

The portion where the four corners are united into one body of the base material for an organ model was fused by means of a soldering iron (100 V, 30 W), to form a sealed base material having a bag-like shape. Thereafter, a material for molding an organ model which was produced in the same manner as in the above was superposed on this formed base material of the organ model, to give an organ model having a shape more similar to the shape of a pear-shaped stomach.

Example 17

An organ model having a shape similar to the shape of a pear-like stomach shape was produced in the same manner as in Example 16. Next, a needle was inserted into the organ model from its surface and the rubber balloon in the organ model burst and shrank. Thereafter, a string was unknotted, and the rubber balloon was taken out from the organ model, to give an organ model not containing a rubber balloon.

Example 18

An organ model was produced in the same manner as in Example 16 except that the rubber balloon was charged with 150 mL of water in place of blowing air into the balloon, and that the rubber balloon which was expanded to a size slightly smaller than the size of a stomach of a human body was used in Example 16. This organ model had a shape similar to the shape of a stomach.

Example 19

An organ model was produced in the same manner as in Example 16 except that the rubber balloon was charged with 150 mL of the viscous gel obtained in Production Example 1 in place of blowing air into the balloon, and that the rubber balloon which was expanded to a size slightly smaller than the size of a stomach of a human body was used in Example 16. This organ model had a shape similar to the shape of a stomach.

Example 20

In Example 16, a rubber balloon made of natural rubber was inserted into another rubber balloon made of natural rubber, which was the same as the above rubber balloon, and thereby the rubber balloons were double layered. A viscous gel obtained in Production Example 1 in amount of 50 mL was poured into the gap between the outer rubber balloon and the inner rubber balloon, and air was blown into the inner rubber balloon, to expand the outer rubber balloon and the inner rubber balloon. Thereafter, the same procedures as in Example 16 were carried out except that these rubber balloons of which opening was sealed were used, to give an organ model. This organ model had a shape similar to the shape of a stomach.

Example 21

A beaker having a volume of 500 mL was charged with 160 mL of dimethyl sulfoxide and 40 mL of water, and mixed thoroughly to prepare a mixed solvent. To 200 mL of the obtained mixed solvent in the beaker was added 200 mL of colloidal silica [available from NISSAN CHEMICAL INDUSTRIES, LTD. under the product name: SNOWTEX XP, particle diameter of silica: about 5 nm, content of silica: 5% by weight], and stirred so that the contents of the beaker had a homogeneous composition.

Next, an aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was added to the above-mentioned beaker so as to have a polyvinyl alcohol concentration of 10% by weight. The ingredients were stirred with heating to 80° C. for 15 minutes, and a mixed solution was obtained.

To the obtained mixed solution, 1 mL of a translucent acrylic poster color having a chestnut color similar to the color of a stomach of a human body [available from Delta Creative Inc. under the product name: Delta Ceramcoat] was added so as to give a homogeneous composition.

The obtained colored mixed solution (liquid temperature: 20° C.) was poured into a rectangular parallelepiped resin container made of polypropylene having an internal length of 25 cm, an internal width of 20 cm and an internal height of 7 cm up to a depth of about 2 mm, and a nylon melt-blown nonwoven fabric (basis weight: 100 g/m$^2$) was overlaid on its surface so that air bubbles were not included in the solution.

Next, the above-mentioned resin container was placed in a refrigeration room (room temperature: −20° C.) and cooled for 5 hours, and then taken out from the refrigeration room and allowed to stand at room temperature, to produce a polyvinyl alcohol sheet.

On the other hand, a melt-blown nonwoven fabric made of nylon (basis weight: 100 g/m$^2$) was placed on a flat stand, and a commercially available laundry starch containing polyvinyl alcohol as a main component was applied to the nonwoven fabric. The polyvinyl alcohol sheet as obtained in the above was overlaid on the nonwoven fabric to unite into one body, and rolling was carried out lightly by means of a cylindrical roller from the surface. The obtained sheet was reversed, and the laundry starch was dried by blowing warm wind with a hair drier [available from Panasonic Corporation under the product name: WIND PRESS EH5401], to give a laminated sheet. The obtained laminated sheet was cut into a size of B5, to give a material for molding an organ model.

Next, a rubber balloon made of natural rubber being expanded to a size slightly smaller than the size of a stomach of a human body (volume: about 0.8 L) by bowing air into the balloon was produced, and its opening was closed.

The material for molding an organ model obtained in the above was placed on a stand so that the opening being sealed was faced upward. Thereafter, four corners of the material for molding an organ model were picked up in fingers and the rubber balloon was wrapped up with the material. The four corners were united into one body and tied with a string, and the excess part of the material for molding an organ model was cut with scissors, to give a base material of an organ model having a shape similar to the shape of a pear-shaped stomach.

The portion where the four corners are united into one body of the base material for an organ model was fused by means of a soldering iron (100 V, 30 W), to form a sealed base material having a bag-like shape. Thereafter, a material for molding an organ model which was produced in the same manner as in the above was superposed on this formed base material of the organ model, to give an organ model having a shape more similar to the shape of a pear-shaped stomach.

Example 22

An organ model having a shape similar to the shape of a pear-like stomach shape was produced in the same manner as in Example 21. Next, a needle was inserted into the organ model from its surface and the rubber balloon in the organ model burst and shrank. Thereafter, a string was unknotted, and the rubber balloon was taken out from the organ model, to give an organ model not containing a rubber balloon. This organ model had a shape similar to the shape of a stomach.

Example 23

An organ model was produced in the same manner as in Example 21 except that the rubber balloon was charged with 150 mL of water in place of blowing air into the balloon, and that the rubber balloon expanded to a size slightly smaller than the size of a stomach of a human body was used in Example 21. This organ model had a shape similar to the shape of a stomach.

Example 24

An organ model was produced in the same manner as in Example 21 except that the rubber balloon was charged with 150 mL of the viscous gel obtained in Production Example 1 in place of blowing air into the balloon, and that the rubber balloon which was expanded to a size slightly smaller than the size of a stomach of a human body was used in Example 21. This organ model had a shape similar to the shape of a stomach.

Example 25

In Example 21, a rubber balloon made of natural rubber was inserted into another rubber balloon made of natural rubber, which was the same as the above rubber balloon, and thereby the rubber balloons were double layered. A viscous gel obtained in Production Example 1 in amount of 50 mL was poured into the gap between the outer rubber balloon and the inner rubber balloon, and air was blown into the inner rubber balloon, to expand the outer rubber balloon and the inner rubber balloon. Thereafter, the same procedures as in Example 21 were carried out except that these rubber balloons of which opening was sealed were used, to give an organ model. This organ model had a shape similar to the shape of a stomach.

Comparative Example 1

An organ model was produced in the same manner as in Example 1 except that the colloidal silica being used in Example 1 was not used.

Comparative Example 2

A polyvinyl alcohol powder (average degree of polymerization: 1700, degree of saponification: 99.0% by mole) in an amount of 80 g was mixed with a polyvinyl alcohol powder (average degree of polymerization: 1800, degree of saponification: 86 to 90% by mole) in an amount of 20 g, to obtain a polyvinyl alcohol mixture. The obtained polyvinyl alcohol mixture was dissolved in a mixed solvent of dimethyl sulfoxide and water [dimethyl sulfoxide/water (weight ratio): 80/20] with heating at 120° C., to prepare a polyvinyl alcohol solution having a water content of 80% by weight.

The obtained polyvinyl alcohol solution was poured into a resin container made of polypropylene having a volume of 200 mL, and thereafter, the resin container was cooled to room temperature.

The contents of the resin container were immersed in 200 mL of ethanol at room temperature for 2 hours, and thereby the dimethyl sulfoxide was replaced with ethanol, to remove the dimethyl sulfoxide. The contents of the resin container were immersed in water, and then the contents were taken out from the resin container.

The contents were observed. As a result, the contents were not sufficiently gelled, had little elasticity and fluidity, and was sticky on its surface. Therefore, an organ model could not be produced from the contents.

Accordingly, it can be understood that a gel having elasticity cannot be produced, even though a polyvinyl alcohol having an average degree of polymerization of 1700 and a degree of saponification of 99.0% by mole is mixed with a polyvinyl alcohol having an average degree of polymerization of 1800 and a degree of saponification of 86 to 90% by mole in a weight ratio of 80/20, the resulting mixture is dissolved in a mixed solvent of water and dimethyl sulfoxide, and cooled to room temperature.

Comparative Example 3

A gel and an organ model was produced in the same manner as in Comparative Example 1 except that after a resin container made of polypropylene having a volume of 200 mL was charged with the polyvinyl alcohol solution, the temperature for cooling this resin container was changed from room temperature to −20° C., and that the solution was frozen at this temperature for 24 hours and thawed by restoring to room temperature. As a result, a gel was obtained, which was different from as in the case of Comparative Example 1. However, it was confirmed that the gel had a low elasticity and was sticky on its surface.

Comparative Example 4

A material for molding an organ model was produced by cutting a commercially available silicone rubber sheet having a thickness of 4 mm into a size of B5.

As a conventional organ model, the material for molding an organ model obtained in the above was used, and an organ model was produced in the same manner as in Example 1 by using the material for molding an organ model obtained in the above.

Experimental Example 1

As the physical properties of an organ models obtained in each example and each comparative example, water wettability (hydrophilic property), an incision feel, flexibility, stickiness and tensile strength were examined in accordance with the following methods. The results are shown in Table 1.

(1) Water Wettability (Hydrophilic Property)

A water droplet was placed on each organ model. The surface condition of the organ model was visually observed, and the water wettability was evaluated in accordance with the following evaluation criteria.

[Evaluation Criteria]
A: Excellent in water wettability
B: Good in water wettability
C: Slightly poor in water wettability
D: Poor in water wettability (2) Incision Feel When an organ model was incised with a surgical scalpel, its condition was examined, and the incision feel was evaluated in accordance with the following evaluation criteria.

[Evaluation Criteria]
A: An incised portion widely extends.
B: An incised portion extends to an extent which arises no problem.
C: An incised portion narrows a little.
D: An incised portion closes.

(3) Flexibility

An organ model was touched with a finger to examine its flexibility, and the flexibility was evaluated in accordance with the following evaluation criteria.

[Evaluation Criteria]
A: Excellent in flexibility
B: Good in flexibility

C: Poor in flexibility a little
D: Poor in flexibility (4) Stickiness

An organ model was touched with a finger to examine stickiness, and the stickiness was evaluated in accordance with the following evaluation criteria.

[Evaluation Criteria]
A: No stickiness is observed.
B: Stickiness is slightly observed.
C: Stickiness is observed to some extent.
D: Stickiness is clearly observed.

(5) Tensile Strength

Each end of an organ model was picked up with a thumb and a forefinger of each hand, respectively, and pulled. The tensile strength was evaluated in accordance with the following evaluation criteria.

[Evaluation Criteria]
A: Excellent in tensile strength
B: Good in tensile strength
C: Slightly poor in tensile strength
D: Poor in tensile strength In Comparative Example 2, the physical properties of an organ model could not be determined, because a gel could not be produced.

TABLE 2

| Example and Comparative Example No. | Physical properties of organ model | | | | |
|---|---|---|---|---|---|
| | Water wettability | Incision feel | Flexibility | Stickiness | Tensile strength |
| Example | | | | | |
| 1 | A | A | A | A | A |
| 2 | A | A | A | B | B |
| 3 | A | A | A | A | A |
| 4 | B | A | A | B | B |
| 5 | A | A | B | A | A |
| 6 | A | A | A | A | A |
| 7 | A | A | A | A | A |
| 8 | A | A | A | A | A |
| 9 | A | A | A | A | A |
| 10 | A | A | A | A | A |
| 11 | A | A | A | A | A |
| 12 | A | A | A | A | A |
| 13 | A | A | A | A | A |
| 14 | A | A | A | A | A |
| 15 | A | A | A | A | A |
| 16 | A | A | A | A | A |
| 17 | A | A | A | A | A |
| 18 | A | A | A | A | A |
| 19 | A | A | A | A | A |
| 20 | A | A | A | A | A |
| 21 | A | A | A | A | A |
| 22 | A | A | A | A | A |
| 23 | A | A | A | A | A |
| 24 | A | A | A | A | A |
| 25 | A | A | A | A | A |
| Comparative Example | | | | | |
| 1 | C | C | A | C | D |
| 2 | — | — | — | — | — |
| 3 | D | C | C | D | D |
| 4 | D | D | B | B | A |

From the result shown in Table 2, it can be seen that each organ model obtained in each example shows excellent effects such as appropriate hydrophilic property and flexibility, no stickiness of the surface, excellent incision feel and high tensile strength, since the organ model obtained in each example contains a crosslinked gel obtained from a polyvinyl alcohol and silica particles.

From the above results, the organ model of the present invention can be suitably used, for example, as an organ model for exercising a surgical excision or suture operation, and the like.

Example 26

A beaker having a volume of 500 mL was charged with 160 mL of dimethyl sulfoxide and 40 mL of water, and mixed thoroughly to prepare a mixed solvent. To 200 mL of the obtained mixed solvent in the beaker was added 20 mL of colloidal silica [available from NISSAN CHEMICAL INDUSTRIES, LTD. under the product name: SNOWTEX XP, particle diameter of silica: about 5 nm, content of silica: 5% by weight], and stirred so that the contents of the beaker had a homogeneous composition.

Next, an aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was added to the above-mentioned beaker so as to have a polyvinyl alcohol concentration of 10% by weight. The ingredients were stirred with heating to 80° C. for 15 minutes, and a mixed solution was obtained.

To the obtained mixed solution, 1 mL of a translucent acrylic poster color having a reddish brown color similar to the color of a liver of a human body [available from Delta Creative Inc. under the product name: Delta Ceramcoat] was added so as to give a homogeneous composition.

A mold having an inner surface having a shape corresponding to the shape of a human liver (a separated mold having an upper mold and a lower mold) was produced from plaster. A mold releasing agent was applied to the inner surface of the mold, and the mold was closed by contacting the upper mold with the lower mold. A colored mixed solution (liquid temperature: 20° C.) obtained in the above was poured into the mold through an injection hole provided in the upper mold.

Next, the above-mentioned mold was placed in a refrigeration room (room temperature: −20° C.), and cooled for 5 hours. Thereafter, the mold was taken out from the refrigeration room, and allowed to stand until the mold had room temperature.

Next, the mold was placed in a dryer and heated to 60° C., and its temperature was maintained for 10 minutes. Thereafter, the mold was taken out from the dryer, and allowed to cool. Thereafter, the mold was opened, and an obtained organ model (length: about 15 cm, width: about 10 cm) was taken out from the mold.

As the physical properties of the organ model having a shape similar to the shape of a liver of a human body, water wettability (hydrophilic property), incision feel, flexibility, stickiness and tensile strength were examined in the same manner as in Example 1. As a result, it was confirmed that the organ model had the same physical properties as an organ model obtained in Example 1.

In addition, when a surgeon observed the organ model obtained in the above, which had a shape similar to the shape of a liver of a human body, he has evaluated that this organ model had a shape similar to the shape of a liver of a human body, and suited for exercising for operation such as an incision operation, or a cutting and suturing operation of a human body.

Example 27

A beaker having a volume of 500 mL was charged with 160 mL of dimethyl sulfoxide and 40 mL of water, and mixed thoroughly to prepare a mixed solvent. To 100 mL of the obtained mixed solvent in the beaker was added 20 mL of colloidal silica [available from NISSAN CHEMICAL INDUSTRIES, LTD. under the product name: SNOWTEX XP, particle diameter of silica: about 5 nm, content of silica: 5% by weight], and stirred so that the contents of the beaker had a homogeneous composition.

Next, an aqueous solution of a polyvinyl alcohol having a viscosity average degree of polymerization of 1700 and a degree of saponification of about 98 to about 99% by mole [available from KURARAY CO., LTD. under the product name: KURARAY POVAL PVA-117] was added to the above-mentioned beaker so as to have a polyvinyl alcohol concentration of 10% by weight. The ingredients were stirred with heating to 80° C. for 15 minutes, and a mixed solution was obtained.

To the obtained mixed solution, 1 mL of a translucent acrylic poster color having a chestnut color similar to the color of a small intestine as an intestinal tract of a human body [available from Delta Creative Inc. under the product name: Delta Ceramcoat] was added, and stirred to so as to give a homogeneous composition.

The obtained colored mixed solution (liquid temperature: 20° C.) was poured into a rectangular parallelepiped resin container made of polypropylene having an internal length of 25 cm, an internal width of 20 cm and an internal height of 7 cm up to a depth of about 4 mm, and a biaxially oriented polyvinyl alcohol film [available from The Nippon Synthetic Chemical Industry Co., Ltd. under the product name: Bovlon (registered trade mark), thickness: about 14 µm] was overlaid on its surface so that air bubbles were not included in the solution.

Next, the above-mentioned resin container was placed in a refrigeration room (room temperature: −20° C.) and cooled for 5 hours. The container was then taken out from the refrigeration room, and allowed to stand at room temperature until the container had room temperature. The obtained sheet was taken out from the resin container, and placed in a dryer. The sheet was heated to 60° C., and allowed to stand at the same temperature for 10 minutes. Thereafter, the sheet was taken out from the dryer and allowed to cool. The obtained sheet was cut into a size of 15 cm in length and 6 cm in width, and a material for molding an organ model was produced.

Next, the obtained material for molding an organ model was curved in the short side direction to form a cylindrical shape so that the biaxially oriented polyvinyl alcohol film forms the outer surface. The mixed solution obtained in the above was applied to the ends of the long side for conjunction in order to bond the ends of the long side with each other, and thereafter, freezing and thawing of the material were carried out in the same manner as in the above, to give an organ model having a shape of a small intestine.

As the physical properties of the obtained organ model, water wettability (hydrophilic property), incision feel, flexibility, stickiness and tensile strength were examined in the same manner as in Example 1. As a result, it was confirmed that the organ model had the same physical properties as an organ model obtained in Example 1.

From the above results, it is can be seen that the organ model of the present invention obtained in [Example II] can be suitably used as an organ model for exercising an operation such as an incision operation, or a cutting and suturing operation of a human body, an organ model for exercising an operation with an endoscope, an organ model for checking the sharpness of a surgical excision tool, and the like.

Example III

Production Example 1

Production of Viscous Gel

A beaker having a volume of 1 L was charged with 300 mL of 10% aqueous solution of a polyvinyl alcohol [degree of saponification: 98 to 99% by mole, average degree of polymerization: 1700, available from KURARAY CO., LTD. under the product name: KURARAY POVAL PVA-117] at 25° C., and thereafter 300 mL of a saturated aqueous solution of borax at 25° C. was added to the beaker and stirred to obtain a gel having a fluidity.

About 600 mL of the obtained mixture containing the fluid gel was added to a beaker having a volume of 2 L, in which 600 mL of a saturated aqueous solution of boric acid at 25° C. was charged in advance, and stirred thoroughly to obtain a viscous gel. A water-soluble acrylic paint (available from Delta Creative Inc. under the product name: Delta Ceramcoat) as a coloring agent was added to the obtained viscous gel to colorize the gel to a color similar to blood, and a colored viscous gel was obtained.

Example 1

Organ Model Containing Rubber Balloon

A polyvinyl alcohol having a viscosity average degree of polymerization of 1700 and a degree of saponification of about 98 to about 99% by mole [available from KURARAY CO., LTD. under the product name: KURARAY POVAL PVA-117] was dissolved in water so as to have a polyvinyl alcohol concentration of 10% by weight. A beaker having a volume of 1 L was charged with 500 mL of the obtained aqueous polyvinyl alcohol solution, and the obtained aqueous polyvinyl alcohol solution was stirred with heating to 80° C. for 15 minutes, and thereafter cooled to ordinary temperature.

Next, an acrylic poster color having a chestnut color which was similar to the color of a stomach or an intestine [available from Delta Creative Inc. under the product name: Delta Ceramcoat] was added to the beaker in an amount of 5 mL, and stirred to so as to be homogeneous, to give a colored aqueous polyvinyl alcohol solution.

On the other hand, a beaker having a volume of 500 mL was charged with 250 mL of warm water at 30 to 40° C., and 20 g of a boric acid powder was added to the beaker. The boric acid powder was dissolved in the water sufficiently, to give an aqueous solution of boric acid.

The above-mentioned aqueous solution of boric acid in a whole amount was gradually added so as to draw a circle to the above-mentioned colored aqueous polyvinyl alcohol solution (liquid temperature: 20° C.), and a resulting crosslinked gel was collected on the liquid surface of the aqueous polyvinyl alcohol solution.

The resulting crosslinked gel was placed on a resin film made of polyvinylidene chloride (45 cm×45 cm, thickness: about 10 µm) laid on a flat stand, and rolled with a cylindrical roller to obtain a crosslinked gel sheet having a thickness of 2 to 4 mm or so. At that time, water exuded from the crosslinked gel was removed from the crosslinked gel. This crosslinked gel sheet was cut into a size of B5, to give a sheet for a surface layer.

Next, a rubber balloon made of natural rubber being expanded to a size slightly smaller than the size of a stomach of a human body (volume: about 0.8 L) by bowing air into the balloon was produced, and its opening was closed. The rubber balloon was placed on the sheet for a surface layer obtained in the above so that the opening of the balloon was faced upward. Thereafter, four corners of the sheet for a surface layer were picked up in fingers, and the rubber balloon was wrapped up with the sheet. The four corners were united into one body and tied with a string, and the excess part of the sheet for a surface layer was cut with scissors, to give a base material of an organ model having a shape similar to the shape of a pear-shaped stomach.

The portion where the four corners are united into one body of the base material for an organ model was fused by means of a soldering iron (100 V, 30 W), to form a sealed base material having a bag-like shape. Thereafter, a crosslinked gel sheet which was produced in the same manner as in the above was superposed on this formed base material of the organ model, to give an organ model having a shape more similar to the shape of a pear-shaped stomach.

Example 2

Organ Model not Containing Rubber Balloon

A base material having a pear-like shape was produced in the same manner as in Example 1. Thereafter, a crosslinked gel sheet produced in the same manner as in Example 1 was overlaid on the base material, to give a pear-shaped organ model having a shape similar to the shape of a stomach.

Next, a needle was inserted into the pear-shaped organ model at an arbitrary position, and the rubber balloon in the organ model was burst and shrank. The string was unknotted, and the rubber balloon was taken out from the organ model, to give an organ model not containing a rubber balloon.

Example 3

Organ Model Containing Rubber Balloon Filled with Viscous Gel

An organ model was produced in the same manner as in Example 1 except that the rubber balloon was filled with 150 mL of the viscous gel obtained in Production Example 1 in place of blowing air into the rubber balloon, and that the rubber balloon which was expanded to a size slightly smaller than the size of a stomach of a human body was used in Example 1. This organ model had a shape similar to the shape of a stomach.

Example 4

Organ Model Containing Rubber Balloon Filled with Gel

An organ model was produced in the same manner as in Example 1 except that the rubber balloon was filled with 150 mL of the viscous gel obtained in Production Example 1 in place of blowing air into the rubber balloon, and that the rubber balloon which was expanded to a size slightly smaller than the size of a stomach of a human body was used in Example 1. This organ model had a shape similar to the shape of a stomach.

Example 5

Organ Model Containing Double Rubber Balloons Filled with Liquid

In Example 1, a rubber balloon made of natural rubber was inserted into another rubber balloon made of natural rubber, which was the same as the above rubber balloon, and thereby the rubber balloons were double layered. A viscous gel obtained in Production Example 1 in amount of 150 mL was poured into the gap between the outer rubber balloon and the inner rubber balloon, and air was blown into the inner rubber balloon, to expand the outer rubber balloon and the inner rubber balloon. Thereafter, the same procedures as in. Example 1 were carried out except that these rubber balloons of which opening was sealed were used, to give an organ model. This organ model had a shape similar to the shape of a stomach.

Comparative Example 1

A polyvinyl alcohol powder (average degree of polymerization: 1700, degree of saponification: 99.0% by mole) in an amount of 80 g was mixed with a polyvinyl alcohol powder (average degree of polymerization: 1800, degree of saponification: 86 to 90% by mole) in an amount of 20 g, to obtain a polyvinyl alcohol mixture.

The obtained polyvinyl alcohol mixture was dissolved in a mixed solvent of dimethyl sulfoxide and water [dimethyl sulfoxide/water (weight ratio): 80/20] with heating at 120° C., to prepare a polyvinyl alcohol solution having a water content of 80% by weight.

The obtained polyvinyl alcohol solution was poured into a resin container made of polypropylene having a volume of 200 mL, and thereafter, the resin container was cooled to room temperature.

The contents of the resin container were immersed in 200 mL of ethanol at room temperature for 2 hours, and thereby the dimethyl sulfoxide was replaced with ethanol, to remove the dimethyl sulfoxide. The contents of the resin container were immersed in water, and then the contents were taken out from the resin container.

The contents were observed. As a result, the contents were not sufficiently gelled, had little elasticity and fluidity, and was sticky on its surface. Therefore, an organ model could not be produced from the contents.

Accordingly, it can be understood that a gel having elasticity cannot be produced, even though a polyvinyl alcohol having an average degree of polymerization of 1700 and a degree of saponification of 99.0% by mole is mixed with a polyvinyl alcohol having an average degree of polymerization of 1800 and a degree of saponification of 86 to 90% by mole in a weight ratio of 80/20, the resulting mixture is dissolved in a mixed solvent of water and dimethyl sulfoxide, and cooled to room temperature.

Comparative Example 2

A gel and an organ model was produced in the same manner as in Comparative Example 1 except that after a resin container made of polypropylene having a volume of 200 mL was charged with the polyvinyl alcohol solution, the temperature for cooling this resin container was changed from room temperature to −20° C., and that the solution was frozen at this temperature for 24 hours and thawed by restoring to room temperature. As a result, a gel was obtained, which was different from as in the case of Comparative Example 1. However, it was confirmed that the gel had a low elasticity and was sticky on its surface.

Comparative Example 3

As a conventional organ model, a material for molding an organ model was produced in the same manner as in Example 1 except that a commercially available silicone rubber sheet having a thickness of 4 mm was used in place of the crosslinked gel sheet in Example 1.

Experimental Example 1

As the physical properties of an organ models obtained in each example and each comparative example, appearance, water wettability (hydrophilic property), incision feel, incision property, stickiness, elasticity, water content and water absorbency after drying were examined in accordance with the following methods. The results are shown in Table 3.

(1) Appearance

Ten students and instructors majoring in surgery in a graduate school of medicine of university observed the appearance of an organ model, and the appearance was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (2) Water Wettability A flat plate made of a resin which constitutes the surface layer of each organ model was produced. For the evaluation of water wettability, a contact angle of water to the plate was determined at 25° C. in an atmosphere by means of a contact angle mater [available from Kyowa Interface Science Co., Ltd. under the product number: CA-X].

(3) Incision Feel

Ten students and instructors majoring in surgery in a graduate school of medicine of university actually performed an operation on an organ model by using a surgical scalpel [available from FEATHER Safety Razor Co., Ltd., stainless steel surgical blade scalpel No. 10] for examining the incision feel, and the incision feel was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (4) Incision Property Ten students and instructors majoring in surgery in a graduate school of medicine of university actually performed an operation on an organ model by using a surgical scalpel [available from FEATHER Safety Razor Co., Ltd., stainless steel surgical blade scalpel No. 10] and observed whether or not the wound of the incised portion extends similarly to an organ of a living body, and incision property was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (5) Stickiness Ten students and instructors majoring in surgery in a graduate school of medicine of university touched an organ model with fingers to examine its stickiness, and the stickiness was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (6) Elasticity Ten students and instructors majoring in surgery in a graduate school of medicine of university touched an organ model with fingers to examine its elasticity, and the elasticity was evaluated in accordance with the following evaluation criteria. Incidentally, the fact that no one gives an evaluation of "D" is an acceptance criterion.

[Evaluation Criteria]
A: Indistinguishable from an organ of a living body
B: Closely similar to an organ of a living body
C: Sufficiently similar to an organ of a living body
D: Not similar to an organ of a living body (7) Water Content The mass of an organ model was determined, and the organ model was dried in a dryer at 40° C. until the change of mass was no longer observed. Thereafter, the water content was determined in accordance with the equation:

[Water Content]=(mass of an organ model before drying)−(mass of an organ model after drying)÷(mass of an organ model before drying)×100.

(8) Water Absorbency after Drying

The organ model dried in the above-mentioned "(7) Water content" was immersed in water at 25° C. for 10 minutes, and the organ model was taken out from the water. Thereafter, the water absorbency after drying was compared with the organ model before drying, and evaluated in accordance with the following evaluation criteria. Incidentally, the fact, that no one gives an evaluation of "D" is an acceptance criterion.

[Evaluation Criteria]
A: Having a surface layer similar to an organ model before drying
B: Having a surface layer not swollen in comparison with an organ model before drying
C: Having a surface layer slightly swollen in comparison with an organ model before drying
D: Having a surface layer considerably swollen in comparison with an organ model before drying In Comparative Example 1, the physical properties of an organ model could not be determined, because a gel could not be produced.

TABLE 3

Physical properties of organ model

| Example No | Appearance A | B | C | D | Water wettability [contact angle degree)] | Incision feel A | B | C | D | Incision property A | B | C | D | Stickiness A | B | C | D | Elasticity A | B | C | D | Water content (%) | Water absorbency after drying |
|---|---|---|---|---|---|---|---|---|---|---|---|---|---|---|---|---|---|---|---|---|---|---|---|
| 1 | 9 | 1 | 0 | 0 | 0 | 8 | 2 | 0 | 0 | 7 | 3 | 0 | 0 | 7 | 3 | 0 | 0 | 9 | 1 | 0 | 0 | 72.1 | A |
| 2 | 10 | 0 | 0 | 0 | 0 | 9 | 1 | 0 | 0 | 9 | 1 | 0 | 0 | 8 | 2 | 0 | 0 | 8 | 2 | 0 | 0 | 72.5 | A |
| 3 | 9 | 1 | 0 | 0 | 0 | 8 | 2 | 0 | 0 | 7 | 2 | 1 | 0 | 8 | 2 | 0 | 0 | 9 | 0 | 1 | 0 | 72.3 | A |
| 4 | 8 | 2 | 0 | 0 | 0 | 8 | 2 | 0 | 0 | 7 | 2 | 1 | 0 | 7 | 2 | 0 | 0 | 8 | 2 | 0 | 0 | 72.4 | A |
| 5 | 9 | 1 | 0 | 0 | 0 | 9 | 1 | 0 | 0 | 8 | 2 | 0 | 0 | 6 | 3 | 0 | 0 | 7 | 2 | 1 | 0 | 72.8 | A |
| Comparative Example 1 | — | — | — | — | — | — | — | — | — | — | — | — | — | — | — | — | — | — | — | — | — | — | — |
| 2 | 1 | 2 | 3 | 4 | 19.1 | 0 | 1 | 1 | 8 | 0 | 0 | 1 | 9 | 0 | 0 | 1 | 9 | 0 | 0 | 2 | 8 | 87.9 | D |
| 3 | 0 | 1 | 4 | 5 | 40 | 1 | 1 | 3 | 5 | 0 | 1 | 3 | 6 | 0 | 0 | 1 | 9 | 0 | 0 | 1 | 9 | 0 | A |

From the result shown in Table 3, it can be seen that each organ model obtained in each example shows excellent effects such as no stickiness of the surface, low water content and little swelling when an organ model being dried is supplied with water as well as elasticity similar to an organ of a living body, extension of the incised portion similar to an organ of a living body when an incision is performed, water wettability and incision feel similar to an organ of a living body, since a crosslinked gel prepared by crosslinking a polyvinyl alcohol with a boric acid compound is used in each organ model obtained in each example.

Experimental Example 2

A sheet (thickness: 2 mm) was produced from the surface layer obtained in Example 1 or the surface layer obtained in Comparative Example 2, which was separately produced, and the sheet was cut into a dumbbell form of 5 mm in width, to give three samples per each material. The sample was drawn at a rate of 1 mm/minute by means of a tensile tester [available from Shimadzu Corporation under the product name: Autograph AGS-5kNG], and strength at the time of rupture (breaking strength) was measured. The average value of three samples per each material was calculated. (03161 As a result, the breaking strength of the surface layer obtained in Example 1 was 0.5 N/mm². In contrast, the breaking strength of the surface layer obtained in Comparative Example 2 was 1.1 N/mm². This fact demonstrates that the material for molding an organ model obtained in Example 1 has a moderate strength, while the material for molding an organ model obtained in Comparative Example 2 has a very high strength and hardness.

From the above results, it is can be seen that the organ model of the present invention obtained in [Example III] can be suitably used as an organ model for exercising an operation such as an incision operation or a cutting and suturing operation of a human body, an organ model for exercising an operation with an endoscope, an organ model for checking the sharpness of a surgical excision tool, and the like.

The invention claimed is:

1. An organ model for use in exercising an operation, said organ model comprising a laminated product molded to have a shape and a size corresponding to an actual organ of a human body, said laminated product comprising:
   (A) a surface layer of a sheet made of a material comprising an aqueous crosslinked gel made of (a) a polyvinyl alcohol having an average degree of polymerization of 300 to 3500 and a degree of saponification of not less than 90% by mole, and (b) an amount of silica particles, and
   (B) a polyvinyl alcohol film,
   wherein the aqueous crosslinked gel further comprises a polysaccharide that includes chitosan, wherein amount of said polysaccharide is not less than 1 parts by weight, and not more than 200 parts by weight, based on 100 parts by weight of the polyvinyl alcohol;
   wherein the polyvinyl alcohol film is provided on an undersurface of the surface layer, and
   wherein the organ model is at least one of a brain model, a heart model, an esophagus model, a stomach model, a bladder model, a small intestine model, a colon model, a liver model, a kidney model, a pancreas model, a spleen model, or a uterus model.

2. The organ model according to claim 1, wherein the aqueous crosslinked gel is crosslinked with dimethyl sulfoxide.

3. The organ model according to claim 1, wherein the aqueous crosslinked gel is crosslinked with boric acid or a salt of boric acid.

4. The organ model according to claim 1, wherein the amount of the silica particles is 0.01 to 50 parts by weight based on 100 parts by weight of the polyvinyl alcohol.

5. The organ model according to claim 1, wherein the organ model has (i) a hydrophilic property similar to an organ of a human body, and (ii) an incision feel that an incises portion opens like an organ of a living human body when an incision is performed.

6. An organ model for use in exercising an operation, said organ model comprising a laminated product molded to have a shape and a size corresponding to an actual organ of a human body, and said laminated product comprising:
   (A) a surface layer of a sheet made of a material comprising an aqueous crosslinked gel made of (a) a polyvinyl alcohol having an average degree of polymerization of 300 to 3500 and a degree of saponification of not less than 90% by mole, and (b) an amount of silica particles, and
   (B) a net-like resin sheet comprising a polyester or a net-like resin sheet comprising a nylon,
   wherein the aqueous crosslinked gel further comprises a polysaccharide that includes chitosan, wherein amount of said polysaccharide is not less than 1 parts by weight, and not more than 200 parts by weight, based on 100 parts by weight of the polyvinyl alcohol;

wherein the net-like resin sheet comprising a polyester or the net-like resin sheet comprising a nylon is provided on an undersurface of the surface layer, and wherein the organ model is at least one of a brain model, a heart model, an esophagus model, a stomach model, a bladder model, a small intestine model, a colon model, a liver model, a kidney model, a pancreas model, a spleen model, or a uterus model.

7. The organ model according to claim 6, wherein the aqueous crosslinked gel is crosslinked with dimethyl sulfoxide.

8. The organ model according to claim 6, wherein the aqueous crosslinked gel is crosslinked with boric acid or a salt of boric acid.

9. The organ model according to claim 6, wherein the amount of the silica particles is 0.01 to 50 parts by weight based on 100 parts by weight of the polyvinyl alcohol.

10. The organ model according to claim 6, wherein the organ model has (i) a hydrophilic property similar to an organ of a human body, and (ii) an incision feel that an incises portion opens like an organ of a living human body when an incision is performed.

11. An organ model for use in exercising an operation, said organ model comprising a laminated product molded to have a shape and a size corresponding to an actual organ of a human body, and said laminated product comprising:

(A) a surface layer of a sheet made of a material comprising an aqueous crosslinked gel made of (a) a polyvinyl alcohol having an average degree of polymerization of 300 to 3500 and a degree of saponification of not less than 90% by mole, and (b) an amount of silica particles, and (B) a nonwoven fabric, wherein the aqueous crosslinked gel further comprises a polysaccharide that includes chitosan, wherein amount of said polysaccharide is not less than 1 parts by weight, and not more than 200 parts by weight, based on 100 parts by weight of the polyvinyl alcohol;

wherein the nonwoven fabric is provided on an undersurface of the surface layer, and wherein the organ model is at least one of a brain model, a heart model, an esophagus model, a stomach model, a bladder model, a small intestine model, a colon model, a liver model, a kidney model, a pancreas model, a spleen model, or a uterus model.

12. The organ model according to claim 11, wherein the aqueous crosslinked gel is crosslinked with dimethyl sulfoxide.

13. The organ model according to claim 11, wherein the aqueous crosslinked gel is crosslinked with boric acid or a salt of boric acid.

14. The organ model according to claim 11, wherein the amount of the silica particles is 0.01 to 50 parts by weight based on 100 parts by weight of the polyvinyl alcohol.

15. The organ model according to claim 11, wherein the organ model has (i) a hydrophilic property similar to an organ of a human body, and (ii) an incision feel that an incises portion opens like an organ of a living human body when an incision is performed.

* * * * *